US008265675B2

(12) United States Patent
Matsumoto et al.

(10) Patent No.: US 8,265,675 B2
(45) Date of Patent: Sep. 11, 2012

(54) MIMO WIRELESS COMMUNICATION SYSTEM AND METHOD BY A PLURALITY OF BASE STATIONS AND MOBILE STATION

(75) Inventors: Mariko Matsumoto, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1192 days.

(21) Appl. No.: 12/098,917

(22) Filed: Apr. 7, 2008

(65) Prior Publication Data

US 2008/0192682 A1 Aug. 14, 2008

Related U.S. Application Data

(63) Continuation of application No. PCT/JP2006/320072, filed on Oct. 6, 2006, now abandoned.

(30) Foreign Application Priority Data

Oct. 7, 2005 (JP) .................................. 2005-294962

(51) Int. Cl.
H04B 7/00 (2006.01)

(52) U.S. Cl. ........ 455/509; 455/436; 455/450; 455/464; 370/328

(58) Field of Classification Search .................... 455/509
See application file for complete search history.

(56) References Cited

U.S. PATENT DOCUMENTS

| 5,887,021 | A | 3/1999 | Keskitalo | |
|---|---|---|---|---|
| 6,473,467 | B1 * | 10/2002 | Wallace et al. | 375/267 |
| 6,741,587 | B2 * | 5/2004 | Holma et al. | 370/362 |
| 6,751,187 | B2 * | 6/2004 | Walton et al. | 370/210 |
| 6,850,741 | B2 * | 2/2005 | Lei et al. | 455/101 |
| 6,870,515 | B2 * | 3/2005 | Kitchener et al. | 343/853 |
| 6,930,981 | B2 * | 8/2005 | Gopalakrishnan et al. | 370/252 |
| 6,956,907 | B2 * | 10/2005 | Ketchum | 375/267 |

(Continued)

FOREIGN PATENT DOCUMENTS

CN 1205140 A 1/1999

(Continued)

OTHER PUBLICATIONS

Umesh, Moon, Ishii, and Nakamura, "Selective Combining for W-CDMA Multimedia Broadcast Multicast Service (MBMS)", IEICE Conference, B-5-148, Mar. 2004; and 3GPP, "Physical Layer Aspects of UTRA High Speed Downlink Packet Access", Chapter 6.2 (p. 12), TR25-848.

(Continued)

*Primary Examiner* — Hai Nguyen
(74) *Attorney, Agent, or Firm* — Scully, Scott, Murphy & Preser PC

(57) ABSTRACT

A MIMO wireless communication system capable of relaxing a reduction in a transmission rate on a cell end far from a base station and ensuring a high transmission rate for a mobile station, irrespectively of a distance from the base station is provided.
In a state 1, the mobile station 21 checks a propagation line quality and instructs only the first base station 11 to transmit data to the mobile station 21.
In a state 2, the mobile station 21 issues a request to divide the data to the first base station 11 and the second base station 12 and to transmit the divided data to the mobile station 21, and holds MIMO communication with the two base stations.
In a state 3, the mobile station 21 requests only the second base station 12 to transmit the data and communicates with the second base station 12.

28 Claims, 18 Drawing Sheets

U.S. PATENT DOCUMENTS

| | | | |
|---|---|---|---|
| 7,072,413 B2* | 7/2006 | Walton et al. | 375/267 |
| 7,120,199 B2* | 10/2006 | Thielecke et al. | 375/267 |
| 7,248,841 B2* | 7/2007 | Agee et al. | 455/101 |
| 7,317,750 B2* | 1/2008 | Shattil | 375/146 |
| 7,346,040 B2* | 3/2008 | Weinstein | 370/339 |
| 7,389,113 B2* | 6/2008 | Johnston | 455/452.2 |
| 7,411,931 B2* | 8/2008 | Holma et al. | 370/335 |
| 7,436,901 B2* | 10/2008 | Tynderfeldt et al. | 375/299 |
| 7,486,931 B2* | 2/2009 | Cho et al. | 455/39 |
| 7,751,352 B2* | 7/2010 | Seo et al. | 370/310 |
| 7,768,979 B2* | 8/2010 | Sutivong et al. | 370/334 |
| 7,809,330 B2* | 10/2010 | Cho et al. | 455/39 |
| 7,869,416 B2* | 1/2011 | Ramakrishna et al. | 370/345 |
| 7,924,935 B2* | 4/2011 | Tong et al. | 375/267 |
| 7,986,633 B2* | 7/2011 | Ryu et al. | 370/252 |
| 8,018,893 B2* | 9/2011 | Sartori et al. | 370/329 |
| 8,060,091 B2* | 11/2011 | Goransson | 455/436 |
| 2002/0110101 A1* | 8/2002 | Gopalakrishnan et al. | 370/335 |
| 2002/0119799 A1* | 8/2002 | Moulsley et al. | 455/525 |
| 2002/0193146 A1* | 12/2002 | Wallace et al. | 455/562 |
| 2003/0186698 A1* | 10/2003 | Holma et al. | 455/436 |
| 2004/0086027 A1* | 5/2004 | Shattil | 375/146 |
| 2004/0152458 A1* | 8/2004 | Hottinen | 455/423 |
| 2004/0171384 A1* | 9/2004 | Holma et al. | 455/436 |
| 2004/0176097 A1* | 9/2004 | Wilson et al. | 455/452.2 |
| 2004/0224691 A1* | 11/2004 | Hadad | 455/442 |
| 2005/0239510 A1* | 10/2005 | Cho et al. | 455/562.1 |
| 2005/0245206 A1* | 11/2005 | Kaikkonen et al. | 455/101 |
| 2005/0281228 A1* | 12/2005 | Oh et al. | 370/331 |
| 2006/0009211 A1* | 1/2006 | Sato | 455/423 |
| 2006/0104229 A1* | 5/2006 | Vannithamby | 370/328 |
| 2006/0199577 A1* | 9/2006 | Ramakrishna et al. | 455/422.1 |
| 2006/0205357 A1* | 9/2006 | Kim | 455/69 |
| 2006/0209754 A1* | 9/2006 | Ji et al. | 370/329 |
| 2006/0234777 A1* | 10/2006 | Vannithamby et al. | 455/562.1 |
| 2006/0250938 A1* | 11/2006 | Khan et al. | 370/208 |
| 2006/0264184 A1* | 11/2006 | Li et al. | 455/101 |
| 2006/0291371 A1* | 12/2006 | Sutivong et al. | 370/208 |
| 2007/0070954 A1* | 3/2007 | Kim et al. | 370/334 |
| 2007/0087756 A1* | 4/2007 | Hoffberg | 455/450 |
| 2007/0135161 A1* | 6/2007 | Molnar et al. | 455/553.1 |
| 2008/0069058 A1* | 3/2008 | Geng et al. | 370/336 |
| 2008/0095223 A1* | 4/2008 | Tong et al. | 375/228 |
| 2008/0107163 A1* | 5/2008 | Goransson | 375/225 |
| 2008/0192682 A1* | 8/2008 | Matsumoto et al. | 370/328 |
| 2008/0214185 A1* | 9/2008 | Cho et al. | 455/424 |
| 2009/0129334 A1* | 5/2009 | Ma et al. | 370/331 |
| 2009/0156227 A1* | 6/2009 | Frerking et al. | 455/455 |
| 2009/0238086 A1* | 9/2009 | Ringstrom et al. | 370/252 |
| 2009/0239565 A1* | 9/2009 | Han et al. | 455/512 |
| 2010/0041425 A1* | 2/2010 | Cesar et al. | 455/501 |
| 2010/0238902 A1* | 9/2010 | Ji et al. | 370/331 |
| 2010/0254354 A1* | 10/2010 | Sutivong et al. | 370/334 |
| 2010/0318861 A1* | 12/2010 | Gesbert et al. | 714/704 |

FOREIGN PATENT DOCUMENTS

| | | |
|---|---|---|
| JP | 06-169485 | 6/1994 |
| JP | 2002-159061 | 5/2002 |
| JP | 2004-032561 | 1/2004 |
| JP | 2004-064240 | 2/2004 |
| JP | 2005-176376 | 6/2005 |
| JP | 2005-252996 | 9/2005 |
| WO | WO 03/026335 A1 | 3/2003 |
| WO | WO 03/041300 A1 | 5/2003 |
| WO | WO 2004/114695 A1 | 12/2004 |
| WO | 2005/079097 A1 | 8/2005 |

OTHER PUBLICATIONS

Chinese Office Action dated Jun. 2, 2011 of corresponding Chinese Patent Application No. 200680037376.3 together with an English language translation.

* cited by examiner

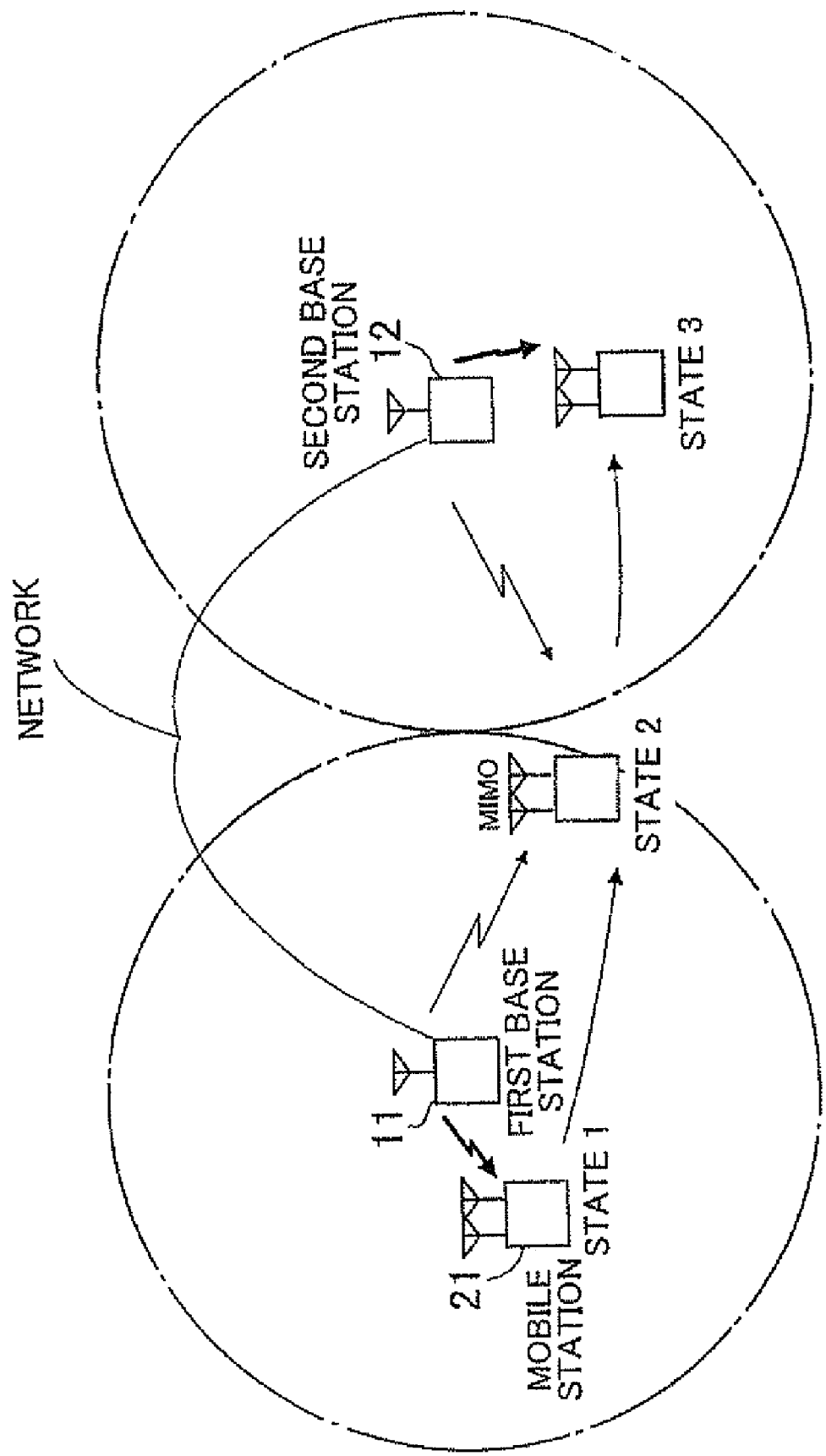

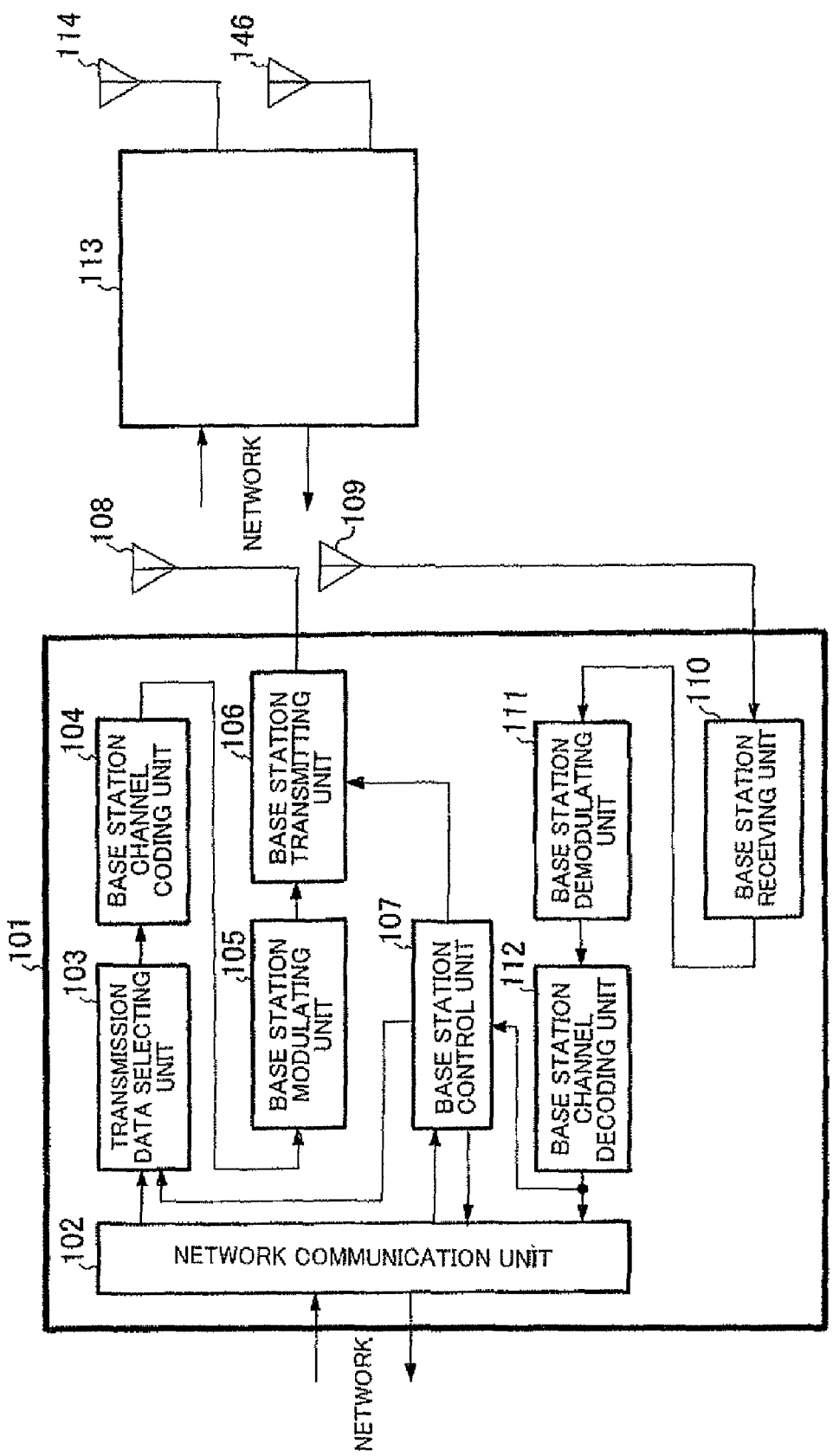

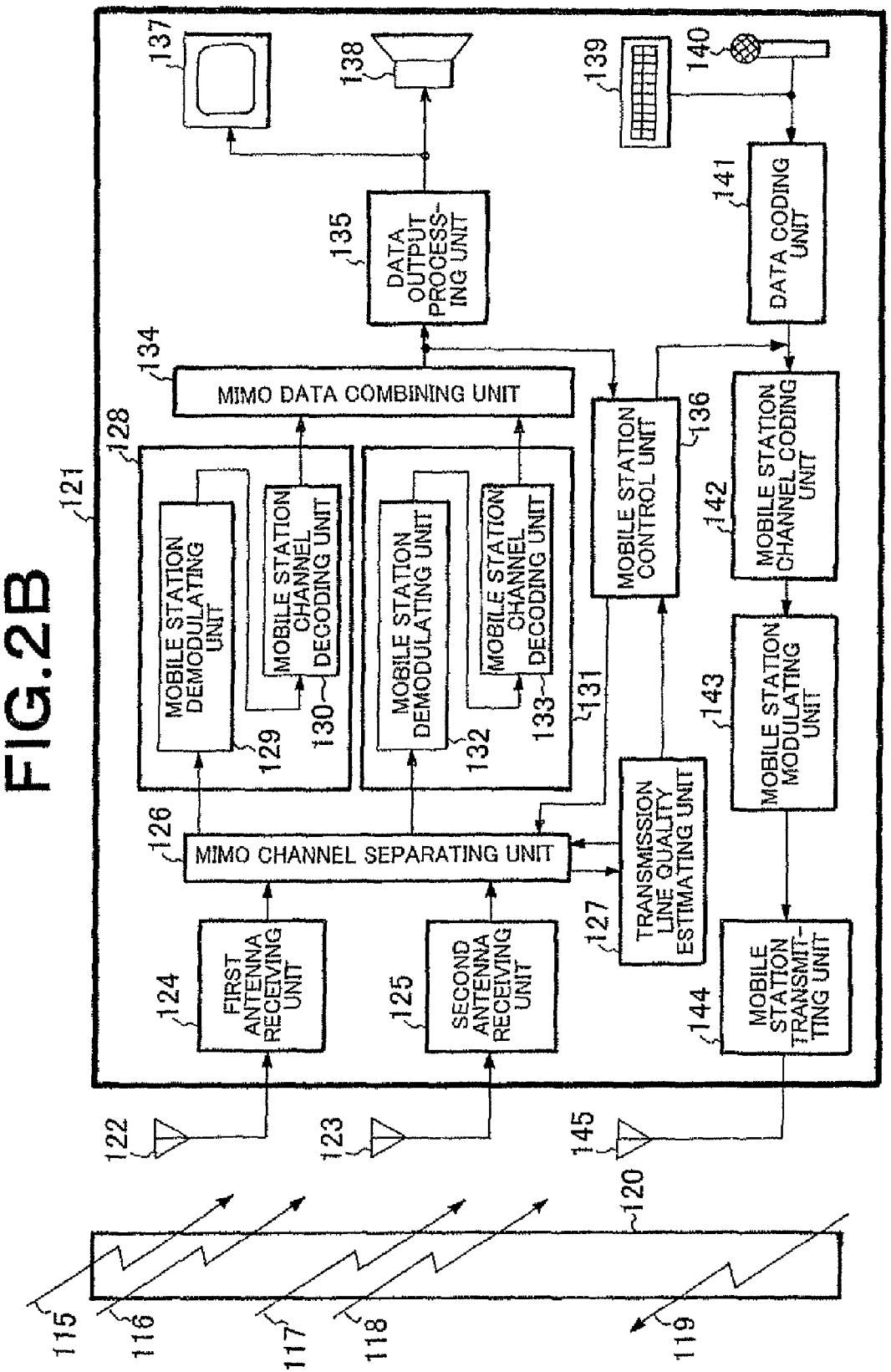

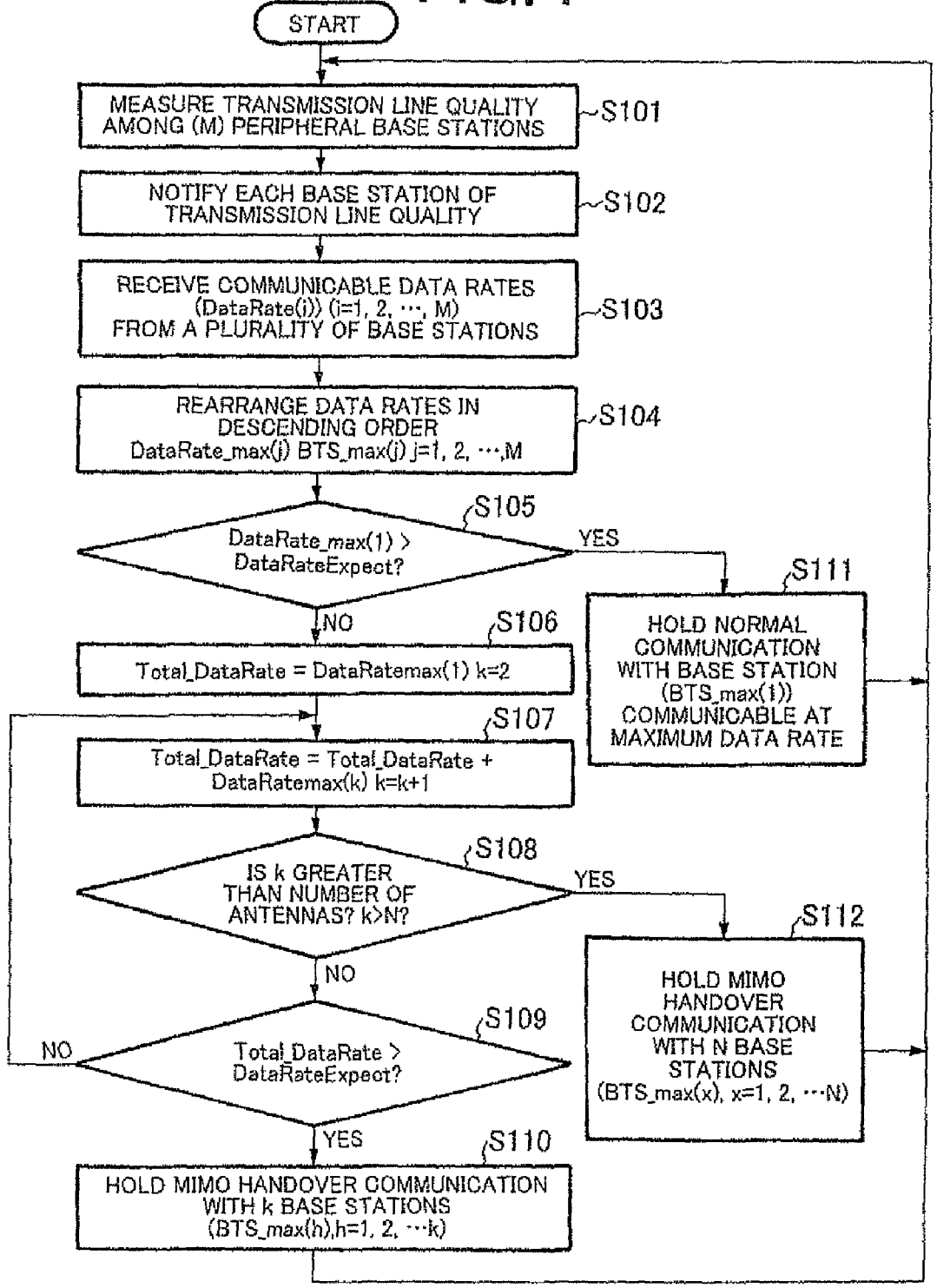

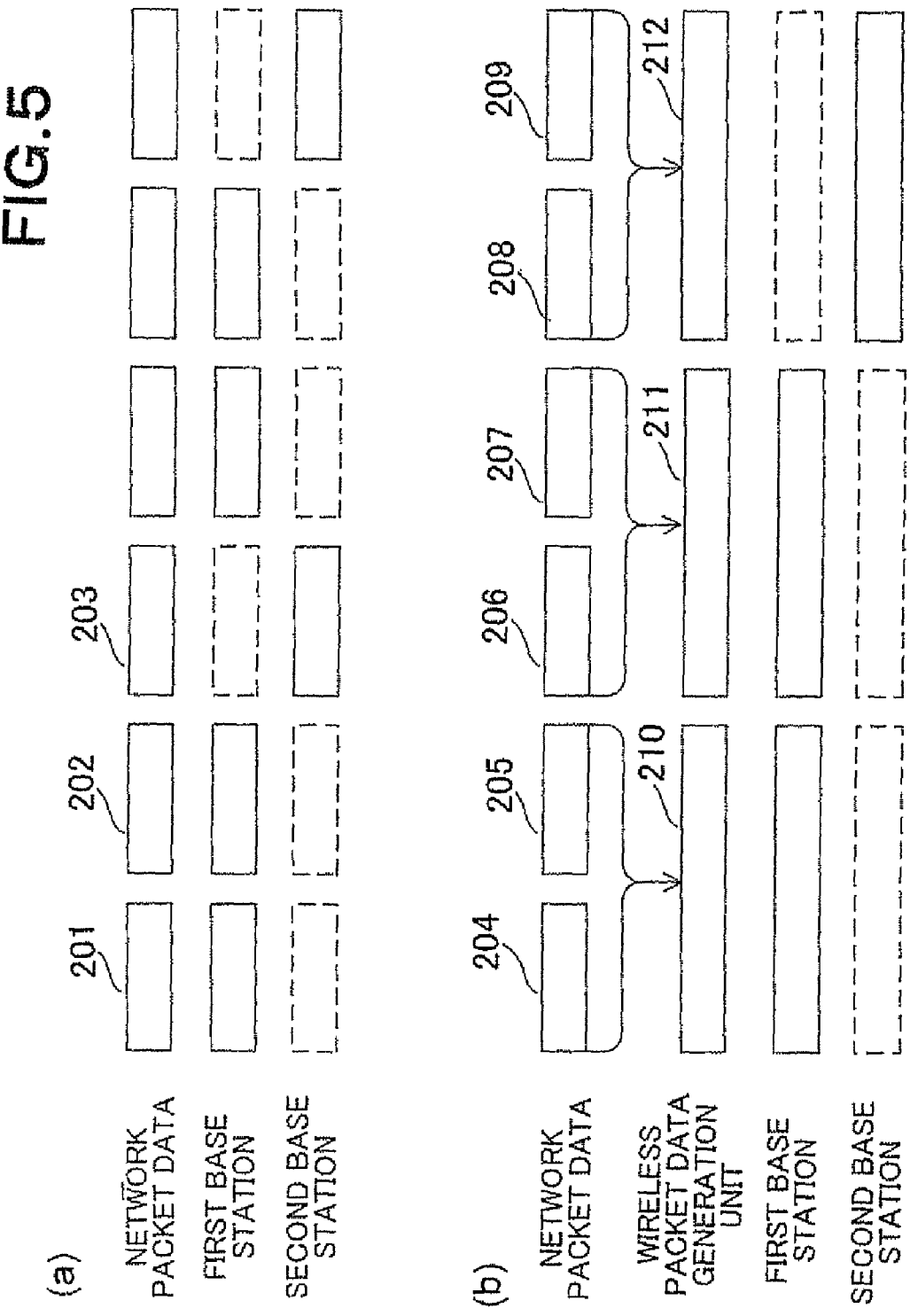

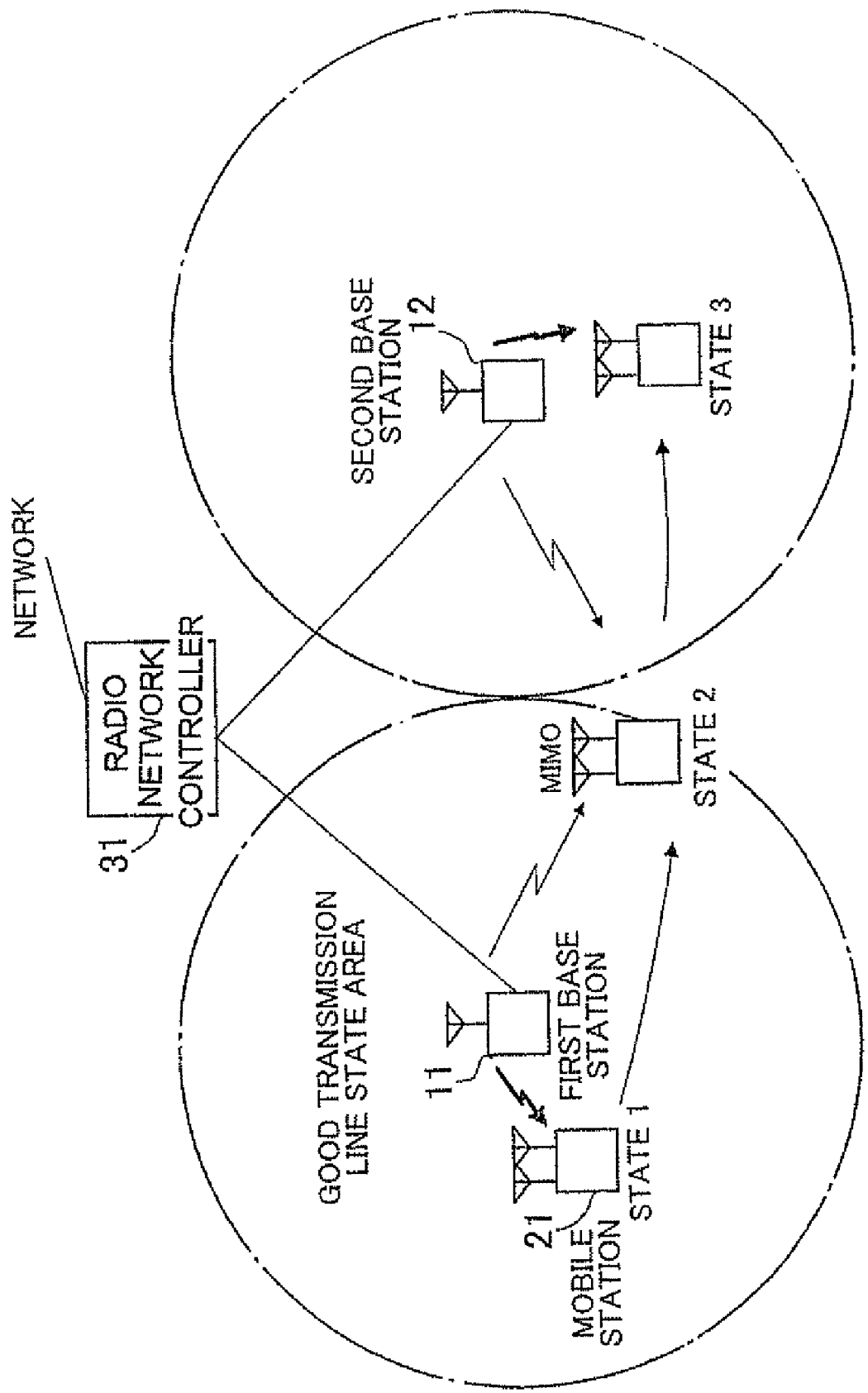

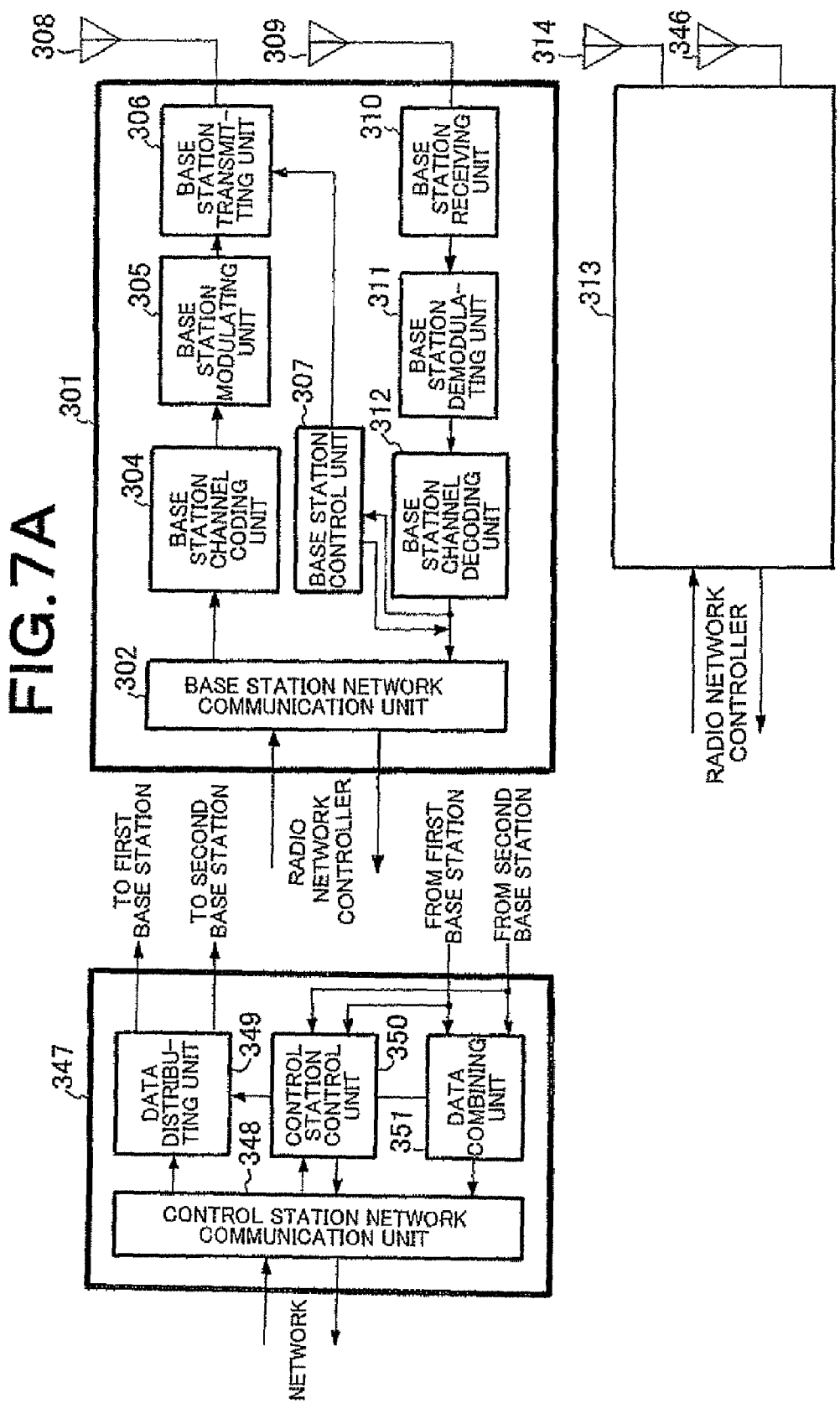

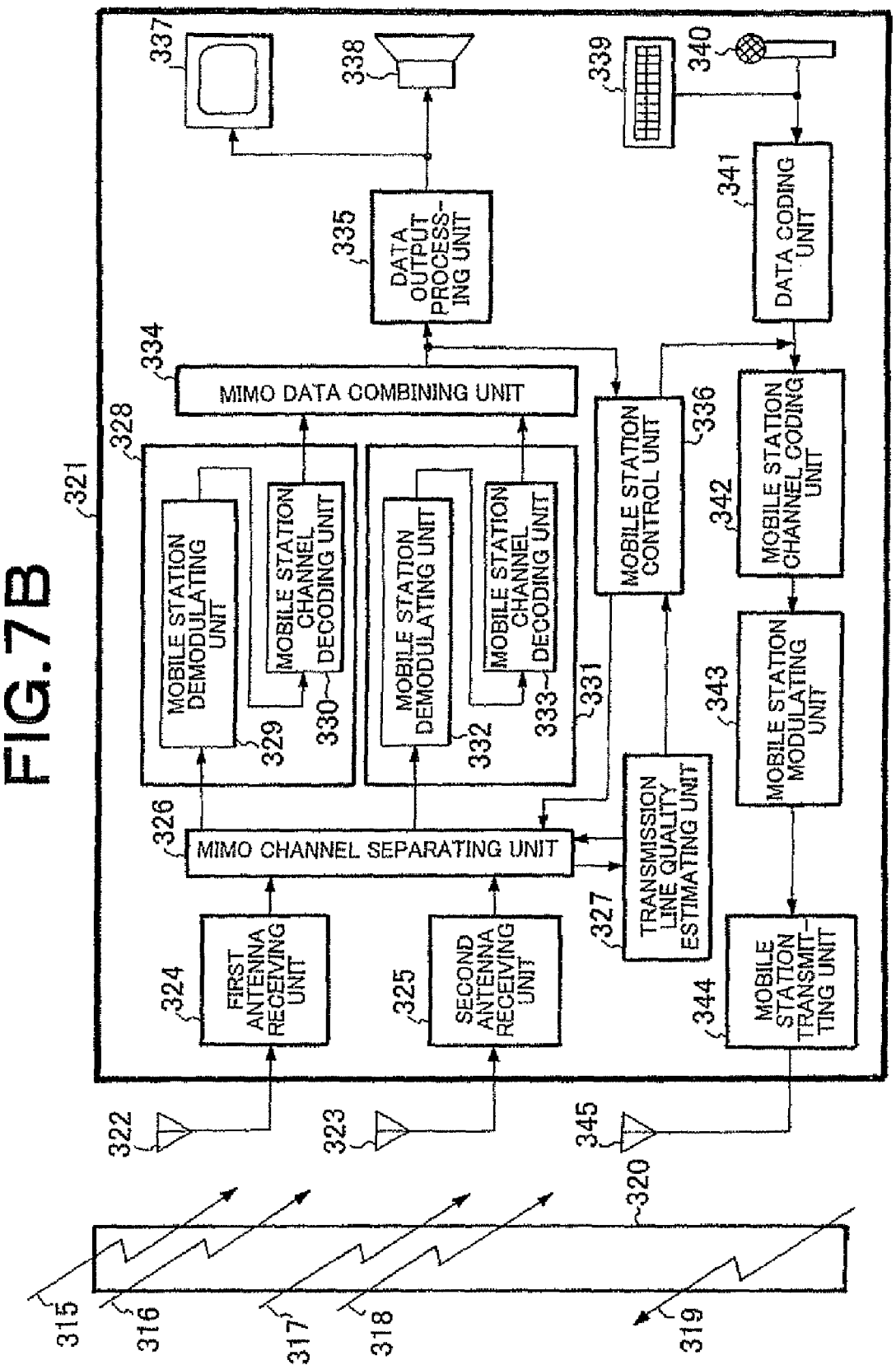

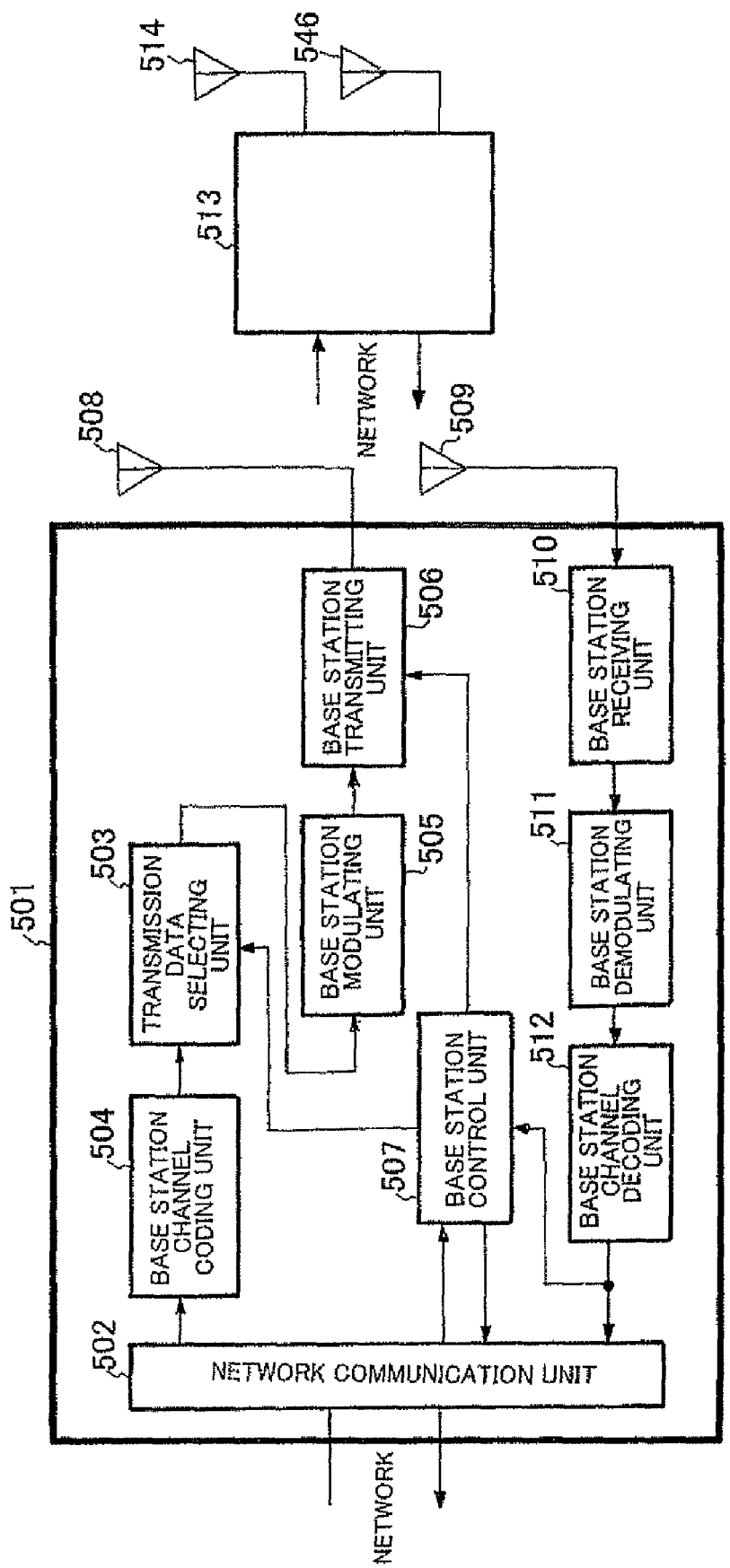

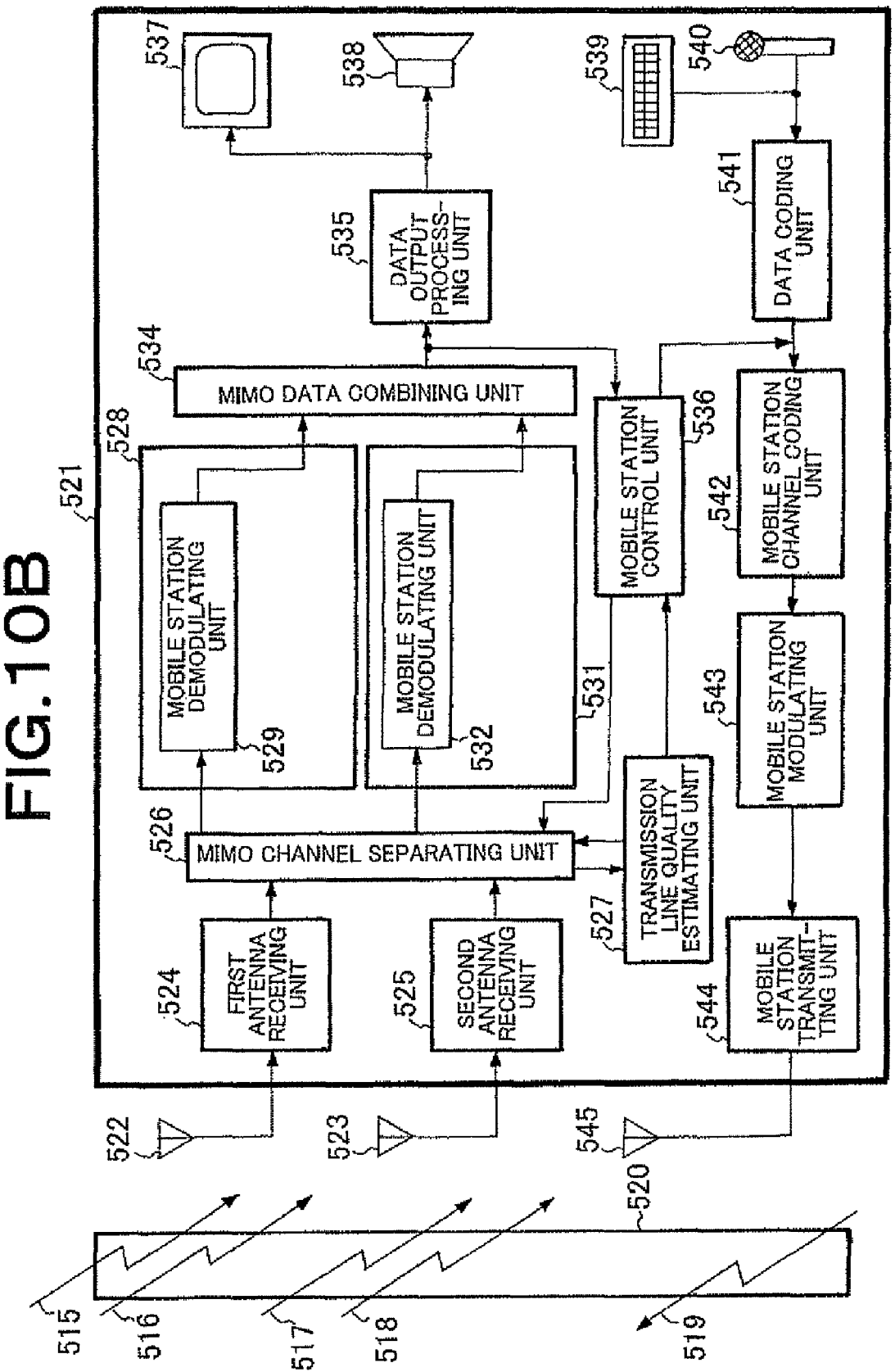

MIMO WIRELESS COMMUNICATION SYSTEM AND METHOD BY A PLURALITY OF BASE STATIONS AND MOBILE STATION

CROSS-REFERENCE TO RELATED APPLICATIONS

This application is a continuation of International Application No. PCT/JP2006/320072 filed on Oct. 6, 2006 which designated the United States and is now abandoned.

TECHNICAL FIELD

The present invention relates to a wireless communication system using MIMO (Multi-Input Multi-Output) in mobile communication, and particularly relates to a system for increasing data transmission rate and data transmission capacity on a cell end.

BACKGROUND ART

In recent years, there is a rapid increase in a rate and a capacity of packet data traffic in a mobile communication cellular system, particularly in downlink. This makes it necessary to develop a wireless transmission method for realizing high efficiency and large capacity. A method of providing high speed transmission using adaptive modulation or using multilevel modulation preferentially for a terminal user near a base station and present in good propagation environment has been developed and worked (see, for example, Non-patent Document 1).

There is also conventionally known a method of preventing crosstalk in a CDMA (Code Division Multiple Access) system by transmitting same signals using the same code from two base stations using soft handover at the time of a handover from a cell 1 to a cell 2 (see, for example, Patent Document 1).

Moreover, there is proposed an MBMS method for improving characteristics by similarly transmitting the same data from two base stations corresponding to two cells, respectively, and selectively receiving the data (see, for example, Non-Patent Document 2).

Furthermore, there is proposed a MIMO method for realizing high efficiency propagation in multipath environment by transmitting different information to respective transmitting antennas between a transmitter including a plurality of antennas and a receiver including a plurality of antennas (see, for example, Patent Document 2).

There is further proposed transmission diversity in a cellular wireless communication system (see, for example, Patent Document 3). A system proposed performs transmission diversity by allocating different orthogonal codes to a first base station and a second base station, respectively.

[Patent Document 1]
 Japanese Patent Application Laid-Open (JP-A) No. 6-169485
[Patent Document 2]
 JP-A-2005-176376
[Patent Document 3]
 JP-A-2004-64240
[Non-Patent Document 1]
 Umesh, Moon, Ishii, and Nakamura, "Selective Combining for W-CDMA Multimedia Broadcast Multicast Service (MBMS)", IEICE Conference, B-5-148, 2004 March

[Non-Patent Document 1]
 3GPP, "Physical Layer Aspects of UTRA High Speed Downlink Packet Access", Chapter 6.2 (page 12), TR25-848

DISCLOSURE OF THE INVENTION

Problems to be Solved

The adaptive modulation has the following problem. High speed transmission is ensured for a user terminal near a base station and present in good propagation environment using multilevel modulation or the like, but not for a user terminal in a bad propagation line state such as a user terminal located on a cell end far from a base station.

It is an object of the present invention to provide a MIMO wireless communication system and a MIMO wireless communication method by a plurality of base stations and a mobile station capable of relaxing a reduction in a transmission rate on a cell end far from each base station and capable of ensuring a high transmission rate for the mobile station irrespectively of a distance of the mobile station from each base station.

Means for Solving the Problems

To solve the problem, a first system according to the present invention includes: a plurality of base stations each of which includes a transmission data selecting unit selecting wireless transmission data from among data transmitted from a network and to be communicated with a single mobile station in a MIMO transmission or reception state (MIMO handover); and a mobile station that includes a MIMO channel separating unit separating signals using transmission line characteristics of the respective base stations during the MIMO handover; a data demodulating unit demodulating and decoding the signals from the respective base stations after causing the MIMO channel separating unit to operate to separate the signals from the respective base stations received via respective antennas; and a MIMO data combining unit combining the signals of the plurality of base station, wherein the mobile station or each of the base stations includes a transmission line state estimating unit estimating a transmission line state between the mobile station and each of the base stations, and the mobile station or each of the base stations includes a control unit determining whether to perform the MIMO handover based on the estimated transmission line state.

Furthermore, a second system according to the present invention includes: a radio network controller including a transmission data distributing unit distributing data transmitted from a network and to be communicated with a single mobile station to a plurality of communicable base stations in a MIMO handover state; the plurality of base stations controlled by the radio network controller; and a mobile station that includes a MIMO channel separating unit separating signals using transmission line characteristics of the respective base stations during the MIMO handover; a data demodulating unit demodulating and decoding the signals from the respective base stations after causing the MIMO channel separating unit to operate to separate the signals from the respective base stations received via respective antennas; and a MIMO data combining unit combining the signals of the plurality of base station, wherein the mobile station or each of the base stations includes a transmission line state estimating unit estimating a transmission line state between the mobile station and each of the base stations, and the radio network controller includes a control unit determining whether to perform the MIMO handover based on the estimated transmission line state.

Advantages of the Invention

According to the present invention, it is possible to relax a reduction in transmission rate on a cell end far from each base station and ensure high transmission rate for the mobile station irrespectively of a distance of the mobile station from each base station. It is also possible to realize transmission with higher efficiency by performing MIMO handover.

BRIEF DESCRIPTION OF THE DRAWINGS

FIG. 1 is a pattern diagram showing a first embodiment of the present invention;
FIG. 2A is a block diagram showing a device configuration according to the first embodiment;
FIG. 2B is a block diagram showing a device configuration according to the first embodiment;
FIG. 4 is a flowchart showing determinations made by a control unit according to the first embodiment;
FIG. 5 is a pattern diagram showing an example of a data distribution and selection method according to the first embodiment;
FIG. 6 is a pattern diagram showing a second embodiment;
FIG. 7A is a block diagram showing a device configuration according to the second embodiment;
FIG. 7B is a block diagram showing a device configuration according to the second embodiment;
FIG. 10A is a block diagram showing a device configuration according to a third embodiment;
FIG. 10B is a block diagram showing a device configuration according to a third embodiment.

DESCRIPTION OF REFERENCE SYMBOLS

Figure 3:
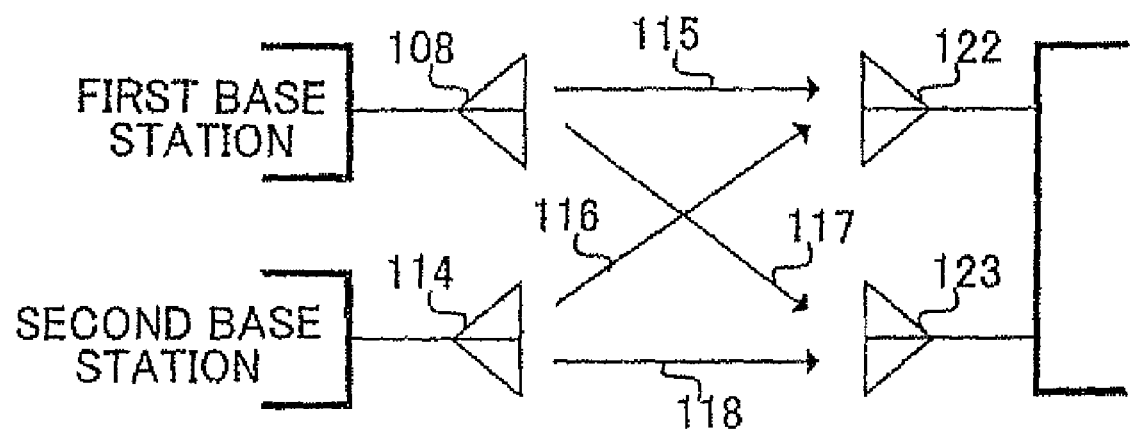
FIG. 3 is a block diagram showing signal transmission according to the first embodiment.

11, 41, 61, 101, 301, 501 first base station
12, 42, 62, 113, 313, 513 second base station
21, 51, 71, 91, 121, 321, 521 mobile station
31, 347 radio network controller
63 third base station
64 fourth base station
81 base station
82 first sector antenna
83 second sector antenna
84 third sector antenna
85 first sector
86 second sector
86 third sector
102, 302, 502 base station network communication unit
103, 503 transmission data selecting unit
104, 304, 504 base station channel coding unit
105, 305, 505 base station modulating unit
106, 306, 506 base station transmitting unit
107, 307, 507 base station control unit
108, 308, 508 first base station transmitting antenna
109, 309, 509 first base station receiving antenna
110, 310, 510 base station receiving unit
111, 311, 511 base station demodulating unit
112, 312, 512 base station channel decoding unit
113, 313, 513 base station demodulating unit
114, 314, 514 second base station transmitting antenna
115, 315, 515 radio wave from first base station to first antenna
116, 316, 516 radio wave from second base station to first antenna
117, 317, 517 radio wave from first base station to second antenna
118, 318, 518 radio wave from second base station to second antenna
119, 319, 519 upstream signal
120, 320, 520 transmission line
121, 321, 521 mobile station
122, 322, 522 first receiving antenna
123, 323, 523 second receiving antenna
124, 324, 524 first antenna receiving unit
125, 325, 525 second antenna receiving unit
126, 326, 526 MIMO channel separating unit
127, 327, 527 transmission line quality estimating unit
128, 328, 528 first base station data demodulating unit
129, 329, 529 mobile station demodulating unit
130, 330, 530 mobile station channel decoding unit
131, 331, 531 second base station data demodulating unit
132, 332, 532 mobile station demodulating unit
133, 333 mobile station channel decoding unit
134, 334, 534 MIMO data combining unit
135, 335, 535 data output processing unit 135
136, 336, 536 mobile station control unit
137, 138, 337, 338, 537, 538 external output device
139, 140, 339, 340, 539, 540 external input device
141, 341, 541 data coding unit
142, 342, 542 mobile station channel coding unit
143, 343, 543 mobile station modulating unit
144, 344, 545 mobile station transmitting unit
145, 345, 545 mobile station transmitting antenna
146, 346, 546 second base station receiving antenna
348 control station network communication unit
349 data distributing unit
350 control station control unit
351 data combining unit

BEST MODES FOR CARRYING OUT THE INVENTION

Best modes for carrying out the present invention will be described hereinafter with reference to the drawings.
[First Embodiment]
FIG. 1 is a pattern diagram showing a first embodiment of the present invention. In a wireless communication system according to the first embodiment, data to be communicated to a mobile station 21 enters a first base station 11 and a second base station 12 from a network. In FIG. 1, the network includes an IP-based core network or the like. In a state 1 in which the mobile station is near the first base station, a distance of the mobile station to the first base station is short and a propagation line state is good. Therefore, high speed transmission is possible, and the base station checks a propagation line quality and instructs the wireless communication system to transmit data only to the first base station using a control signal. When moving to a location in a state 2, the mobile station is away from the first base station and the transmission line state is worse, accordingly. However, since the mobile station can communicate with the second base station along with a reduction in possible transmission data rate, then the mobile station requests the wireless communication system to transmit the data in a manner in which the data is divided between the first and second base stations, and establishes a communication connection (establishes a link) to the two base stations, whereby a MIMO transmission and reception with a plurality of base stations is held. When moving to a location in a state 3, the mobile station cannot communicate with the first base station and a propagation line state of a propagation line between the mobile station and the second base station is improved. Therefore, high speed transmission is possible, and the mobile station requests only the second base station to transmission data to the mobile station and communicates with the second base station.

FIGS. 2A, 2B and 3 are block diagrams showing respective devices according to the first embodiment. The first base station 11 shown in FIG. 1 corresponds to a first base station 101, the second base station 12 shown in FIG. 1 corresponds to a second base station 113, and the mobile station 21 shown in FIG. 1 corresponds to a mobile station 121.

Referring to FIGS. 2A and 2B, in the first base station, a base station network communication unit 102 receives a signal transmitted from a network and notified to the mobile station. In an MIMO handover state, a base station control unit 107 controls a transmission data selecting unit 103 to select transmission data, a base station channel coding unit 104 to perform channel coding, and a base station modulating unit 105 to perform modulation such as multilevel modulation, CDMA or OFDM (Orthogonal Frequency Divisional Multiplexing). The signal is transmitted from a first base station transmitting antenna 108 via a base station transmitting unit 106 including a DA converter and the like. It is to be noted that the OFDM is a communication method in which a plurality of subchannels is included in one frequency band.

While the second base station operates similarly to the first base station, transmission data selecting units of the respective base stations select different data so as to transmit all data as a whole. The second base station may be either different from or the same as the first base station in a data rate and a modulation method such as QPSK or 16 QAM, depending on a transmission line state. The second base station is the same as the first base station in a modulation method such as CDMA or OFDM. If the modulation method is the CDMA, the second base station has the same spreading code as that of the first base station. If the modulation method is the OFDM, the second base station has the same frequency band (performs the same MIMO transmission) as that of the first base station. The second base station transmits a coded and modulated signal from a second base station transmitting antenna 114. At this time, a frequency band of the transmission signal from the first base station is the same as that from the second base station, so that the first and second base station transmit the signals simultaneously.

After these signals are transmitted via a transmission line 120 and influenced by the transmission line 120, the mobile station 121 receives a combined wave of a signal 115 from the first base station and a signal 116 from the second base station via a first receiving antenna 122 and a first antenna receiving unit 124 including an AD converter and the like, and also receives a combined wave of a signal 117 from the first base station and a signal 118 from the second base station via a second receiving antenna 123 and a second antenna receiving unit 125 (see FIG. 3).

During a MIMO handover, a mobile station control unit 136 controls a MIMO channel separating unit 126 that separates the signals using respective transmission line characteristics or the like to operate. The MIMO channel separating unit 126 separates the signals received via the respective antennas and transmitted from the respective base stations, and eliminates the influence of the propagation lines from the separated signals. In a first base station data demodulating unit 128, a mobile station demodulating unit 129 subjects the signal from the first base station to demodulation such as multilevel modulation, CDMA or OFDM, and a mobile station channel decoding unit 130 performs code decoding. Further, in a second base station data demodulating unit 131, a mobile station demodulating unit 132 subjects the signal from the second base station to similar demodulation, and a mobile station channel decoding unit 133 decodes the demodulated signal. A MIMO data combining unit 134 constituted by a buffer and the like combines these signals, a data output processing unit 135 performs an image processing, a voice processing and the like on the combined signal, and the resultant signal is output from external output devices 137 and 138.

Moreover, the mobile station control unit 136 controls a transmission line quality estimating unit 127 to estimate a transmission line state between each of the base stations and the mobile station such as a signal-to-noise ratio (SNR), a pilot power, a delay spread representing a multipath state, and a path delay, to determine whether to perform a MIMO handover, and to request each of the base stations to transmit data to the mobile station. Further, the mobile station control unit adds a control signal, e.g., ACK or NACK, representing whether reception of reception data is normally completed, to an upstream signal.

Input signals from external input devices 139 and 140 are subjected to voice coding, an image processing, and the like by a data coding unit 141, coded by a mobile station channel coding unit 142, subjected to modulation such as multilevel modulation, CDMA or OFDM by a mobile station modulating unit 143, and transmitted by a mobile station transmitting unit including a DA converter and the like and a mobile station transmitting antenna 145.

In the first embodiment, it is assumed that the transmission line state between the first base station and the mobile station is better than that between the second base station and the mobile station. In this case, in the first base station, a first base station receiving antenna 109 and a base station receiving unit 110 that includes an AD converter and the like receive an upstream signal 119, a base station demodulating unit 111 performs demodulation such as multilevel modulation, CDMA or OFDM, on the upstream signal 119, a base station channel decoding unit 112 performs channel decoding on the demodulated upstream signal, and the resultant signal is transmitted to the network from the base station network communication unit 102. Further, the base station control unit 107 exercises a control such as retransmission of a downstream data signal using a control signal included in the upstream signal. Likewise, in the second base station, a second base station receiving antenna 146 receives an upstream signal. However, in the second base station, the base station control unit 107 exercises a control to retransmit a downstream signal using an upstream control signal but does not perform an upstream data signal processing.

If only the first base station transmits data to this mobile station in a non-MIMO handover state, then the base station control unit of the first base station controls the transmission data selecting unit to select all data on this mobile station, and the signal is transmitted after being coded and modulated. However, the base station control unit of the second base station does not control the transmission data control unit to select data on this mobile station, and the second base station does not hold a data communication with this mobile station.

The mobile station receives the signal only from the first base station. The mobile station can, therefore, perform reception diversity using the first and second antennas or reduce power consumption by using only the first antenna and the first antenna receiving unit and stopping the second antenna and the second antenna receiving unit. Alternatively, the transmission line quality estimating unit can be located in each of the first and second base stations.

While the mobile station control unit makes a determination as to whether to perform the MIMO handover in the first embodiment, the base station control units can make such determinations.

FIG. 4 is a flowchart showing an example of a determining method of the control unit as to whether to perform the MIMO handover.

The mobile station control unit measures the signal-to-noise ratio (SNR) representing the propagation line quality between the mobile station and each of M peripheral base stations, the delay spread representing the spread of the propagation line and the like (S101). The mobile station control unit notifies each of the base stations of a measurement result and transmits an inquiry to each of the base stations (S102). Each base station control unit exercises a control to select adaptive modulation corresponding to its transmission line quality, and notifies the mobile station of a modulation method and a communicable data rate DataRate (i) (i=1, 2, . . . M) (S103). The mobile station rearranges the data rates in a descending order of values or rearranges the data rates while adding priorities to the respective base stations in a descending order, and creates a matrix BTS_max(j) of the maximum data rate DataRate_max(j) and the base station related to the maximum data rate DataRate_max(j) (S104).

The mobile station control unit determines whether the maximum data rate DataRate_max(1) is higher than a preset data rate expected value DataRateExpect (S105). If the maximum data rate DataRate_max(1) is higher, the mobile station control unit decides to communicate only with the base station (BTS_max(1)) communicable at the maximum data rate (S111). If the maximum data rate DataRate_max(1) is not higher, then the mobile station control unit adds possible data rates of the respective base stations in descending order, calculates the number k of base stations satisfying the data rate expected value (S106, S107, and S109), and decides to hold MIMO handover communication with top k base stations (S110). However, if the number k exceeds the number N of MIMO antennas owned by the mobile station, the mobile station control unit decides to hold MIMO handover communication with top N base stations (S108 and S112).

The "priorities of the base stations" herein are often dynamic ones depending on whether or not the measured transmission line qualities and temporal changes in possible data rates notified by the respective base stations are improving. Furthermore, the priorities often include those set fixedly depending on the base stations or the mobile station such as capacities of the respective base stations or designation of the mobile station user under contract.

Moreover, the processing can be accelerated by mobile station's determination based on the measured propagation line qualities without inquires about possible data rates to the respective base stations. With this method, the mobile station control unit makes determinations, notifies the respective base stations of the determinations using control signals, and starts communication. Alternatively, the mobile station can estimate the propagation line qualities and notify the respective base stations of the estimated propagation line qualities, and the base stations can make determinations while communication with one another. Alternatively, if the radio network controller mediates, the control station control unit can make this determination. In another alternative, each base station can estimate the propagation line quality using an upstream signal pilot.

Operation performed by the transmission data selecting unit ("103" of FIG. 2A) will be described with reference to the pattern diagram of FIG. 5 showing an example of a data distribution and selection method. In this example, it is assumed that the base stations differ in propagation line quality between the mobile station and the base station. The propagation line quality between the first base station and the mobile station is higher than that between the second base station and the mobile station, and the first base station differs in possible data rate from the second base station. Due to this, the control unit distributes more data to the first base station capable of higher speed transmission and less data to the second base station capable of lower speed transmission. Each base station adaptively allocates multilevel modulation or the like to the transmission line having a good transmission line quality, and holds high speed communication.

In case of (a) in FIG. 5, data is transmitted from the network in the form of network packet data. The transmission data selecting unit ("103" of FIG. 2A) of the first base station selects network packet data 201 and 202 without selecting network packet data 203. The base station data selecting unit of the second base station selects only the network packet data 203 without selecting the network packet data 201 and 202. These pieces of data are transmitted from the respective base stations, received by the mobile station, and combined by the MIMO data combining unit, thus providing all the data.

With this method, the individual base stations can communicate with data senders in the network independently. This can avoid complicating communication process in the network.

In case of (b) in FIG. 5, difference of a data length of network packet data from a wireless packet data creation unit is considered. In this example, two network packet data constitutes wireless packet data. Due to this, the first base station transmits network packet data 204 to 207 and the second base station transmits network packet data 208 and 209. With this method, processing performed by the mobile station is less complex than that of the previous method.

Moreover, it is obvious to distribute all the data to a single base station in a communication with the single base station having a good propagation line quality.

[Second Embodiment]

FIG. 6 is a pattern diagram showing a second embodiment of the present invention. In a wireless communication system according to the second embodiment, data to be communicated to a mobile station 21 enters a radio network controller 31 from a network. The radio network controller connects the network to a plurality of base stations. In a state 1 in which the mobile station is near a first base station 11, a distance of the mobile station to the first base station is short and a propagation line state is good. Therefore, high speed transmission is possible, and the radio network controller controls the first base station to transmit data to the mobile station. When moving to a location in a state 2, the mobile station is away from the first base station and the transmission line state is worse, accordingly. Since the mobile station can communicate with the second base station along with a reduction in possible transmission data rate between the first base station and a terminal, then the radio network controller divides the data to the first base station and the second base station, and controls the two base stations to transmit different data to hold MIMO communication with the mobile station. It is thereby possible to realize high speed data transmission by the two base stations although a data rate of a communication between the base stations is low. When further moving to a location in a state 3, the mobile station cannot communicate with the first base station and a propagation line quality of a propagation line between the mobile station and the second base station is improved. Therefore, high speed transmission by a single base station is possible, and the radio network controller transmits data only to the second base station and controls the second base station to communicate with the mobile station.

Figure 8:
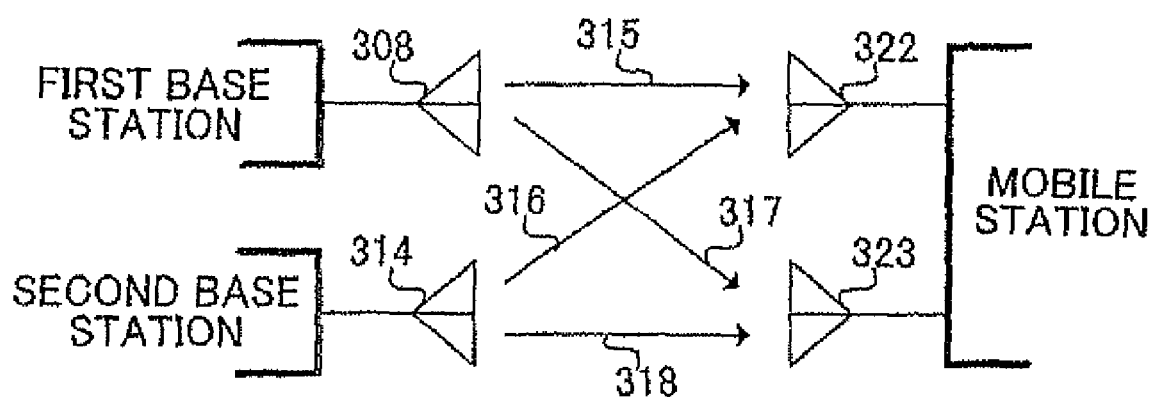
FIG. 8 is a block diagram showing signal transmission according to the second embodiment.

FIGS. 7A, 7B and 8 are block diagrams showing respective devices according to the second embodiment. The radio network controller 31 shown in FIG. 6 corresponds to a radio network controller 347, the first base station 11 shown in FIG. 6 corresponds to a first base station 301, the second base station 12 shown in FIG. 6 corresponds to a second base station 313, and the mobile station 21 shown in FIG. 6 corresponds to a mobile station 321.

Referring to FIGS. 7A and 7B, in the radio network controller 347, a control station network communication unit 348 receives a signal transmitted from a network and notified to the mobile station, and a control station control unit 350 controls a data distributing unit 349 to distribute and transmits data to the first base station and the second base station in a MIMO handover state. In the first base station, a base station network communication unit 302 receives the signal from the radio network controller, a base station channel coding unit 304 to perform channel coding, and a base station modulating unit 305 to perform modulation such as multilevel modulation, CDMA or OFDM. The signal is transmitted from a first base station transmitting antenna 308 via a base station transmitting unit 306 including a DA converter and the like.

While the second base station operates similarly to the first base station, an amount of data distributed to the second base station may be either the same as or different from that distributed to the first base station depending on the transmission line state. The second base station may be either the same as or different from the first base station in a data rate and a modulation method such as QPSK or 16 QAM, depending on the transmission line state. The second base station is the same as the first base station in a modulation method such as CDMA or OFDM. If the modulation method is the CDMA, the second base station has the same spreading code as that of the first base station. If the modulation method is the OFDM, the second base station has the same frequency band (performs the same MIMO transmission) as that of the first base station. The second base station transmits a coded and modulated signal from a second base station transmitting antenna 314. At this time, a frequency band of the transmission signal from the first base station is the same as that from the second base station, so that the first and second base station transmit the signals simultaneously.

After these signals are transmitted via a transmission line 320 and influenced by the transmission line 320, the mobile station 321 receives a combined wave of a signal 315 from the first base station and a signal 316 from the second base station via a first receiving antenna 322 and a first antenna receiving unit 324 including an AD converter and the like, and also receives a combined wave of a signal 317 from the first base station and a signal 318 from the second base station via a second receiving antenna 323 and a second antenna receiving unit 325 (see FIG. 8).

During a MIMO handover, a mobile station control unit 336 controls a MIMO channel separating unit 326 constituted by MMSE, QR separation or the like to operate. The MIMO channel separating unit 326 separates the signals received via the respective antennas and transmitted from the respective base stations, and eliminates the influence of the propagation line from the separated signals. In a first base station data demodulating unit 328, a mobile station demodulating unit 329 subjects the signal from the first base station to demodulation such as multilevel modulation, CDMA or OFDM, and a mobile station channel decoding unit 330 performs code decoding. Likewise, in a second base station data demodulating unit 331, a mobile station demodulating unit 332 subjects the signal from the second base station to similar demodulation, and a mobile station channel decoding unit 333 decodes the demodulated signal. A MIMO data combining unit 334 constituted by a buffer and the like combines these signals, a data output processing unit 335 performs an image processing, a voice processing and the like on the combined signal, and the resultant signal is output from external output devices 337 and 338.

Moreover, the mobile station control unit 336 controls a transmission line quality estimating unit 327 to estimate a transmission line state between each of the first and second base stations and the mobile station such as a signal-to-noise ratio (SNR), a delay spread representing a multipath state, and to notify each of the base stations of estimation results. Further, the mobile station control unit adds a control signal, e.g., ACK or NACK, representing whether reception of reception data is normally completed, to an upstream signal.

Input signals from external input devices 339 and 340 are subjected to voice coding, an image processing, and the like by a data coding unit 341, coded by a mobile station channel coding unit 342, subjected to modulation such as multilevel modulation, CDMA or OFDM by a mobile station modulating unit 343, and transmitted by a mobile station transmitting unit including a DA converter and the like and a mobile station transmitting antenna 345.

In the first base station, a first base station receiving antenna 309 and a base station receiving unit 310 that includes an AD converter and the like receive an upstream signal 319, a base station demodulating unit 313 performs demodulation such as multilevel modulation, CDMA or OFDM, on the upstream signal 319, a base station channel decoding unit 312 performs channel decoding on the demodulated upstream signal, and the resultant signal is transmitted to the radio network controller from the base station network communication unit. Further, the base station control unit 307 exercises a control such as retransmission of a downstream signal using a control signal included in the upstream signal. Likewise, in the second base station, a second base station receiving antenna 346 receives and signal processes an upstream signal, and data transmission and retransmission control for transmitting or retransmitting data to the radio network controller is exerted. In the radio network controller, the data combining unit 351 selectively combines these pieces of data according to the transmission line states and the combined data is transmitted to the network from the control station network communication unit.

In a non-MIMO handover state, the control station control unit controls the data distributing unit to transmit data only to the first base station. Therefore, the first base station transmits data to the mobile station but the second base station does not communicate data with the mobile station.

The mobile station receives the signal only from the first base station. The mobile station can, therefore, perform reception diversity using the first and second antennas or reduce power consumption by using only the first antenna and the first antenna receiving unit and stopping the second antenna and the second antenna receiving unit. Alternatively, the transmission line quality estimating unit can be located in each of the first and second base stations.

Furthermore, an upstream data signal processing in the base station having a bad transmission line state can be stopped.

Figure 9:
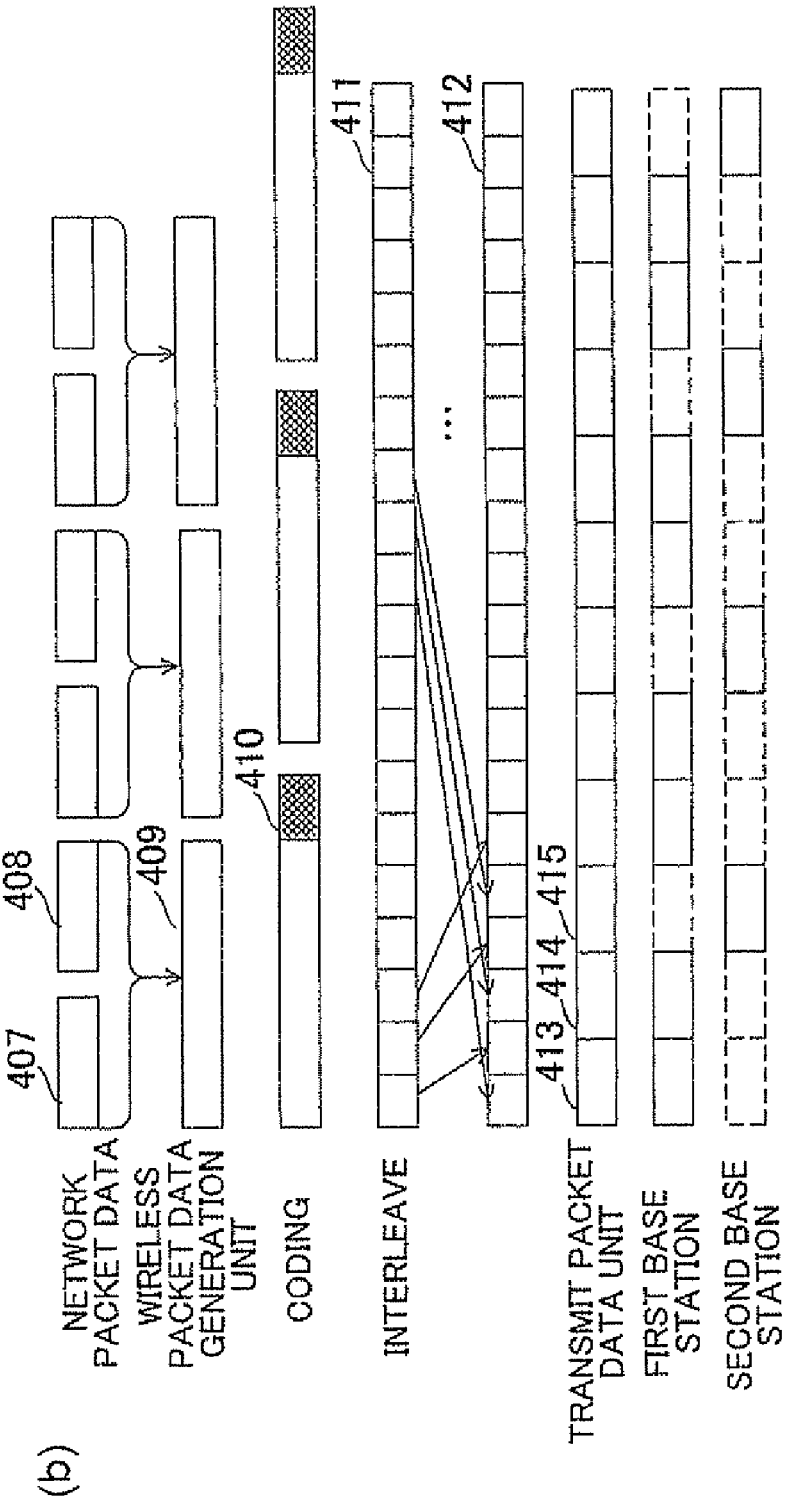
FIG. 9 is a pattern diagram showing an example of a data distribution and selection method according to the second embodiment.

FIG. 9 is a pattern diagram showing an example of a data distribution and selection method according to the second embodiment.

(a) in FIG. 9 shows an example of distribution if propagation line qualities between each base station and the mobile station differ. If the propagation line quality of the first base station is higher than that of the second base station, the first and second base stations differ in possible transmission data rate. Due to this, the data distributing unit ("349" of FIG. 7A) of the radio network controller distributes more data (401, 402, 404, and 405) to the first base station capable of higher speed transmission and less data (403 and 406) to the second base station capable of lower speed transmission among data 401 to 406 to be transmitted to the mobile station.

(b) in FIG. 9 shows an example of data distribution after channel coding. Network packet data 407 and 408 constitutes a wireless packet data creation unit 409, the wireless packet data creation unit 409 is coded and a redundant bit 410 is added to the coded data, the data is integrated (411), subjected to interleaving (412), and separated to wireless packet data unit. Wireless packet data 413 and 414 is distributed to the first base station, and wireless packet data 415 is distributed to the second base station.

With this method, each base station needs to modulate and code even non-transmitted data, and the base station needs to buffer pre-decoded data if data transmission from each base station has a delay, thus making processing complicated. Nevertheless, characteristics are often improved by the difference in transmission line characteristics between each base station and the mobile station and the effect of codes. This improved method will be described in a third embodiment below.

[Third Embodiment]

Figure 11:
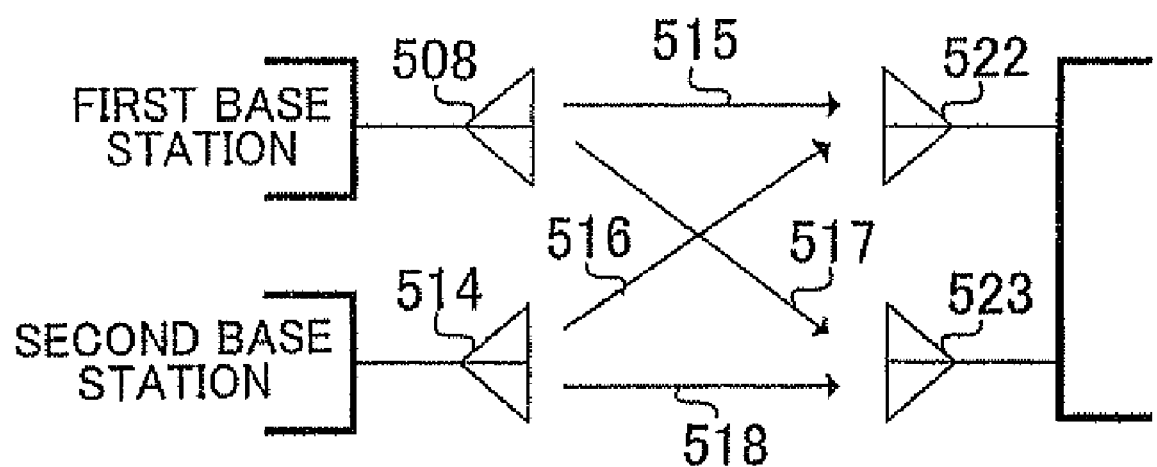
FIG. 11 is a block diagram showing signal transmission according to the third embodiment.

FIGS. 10A, 10B and 11 are block diagrams showing respective devices according to a third embodiment of the present invention. In FIGS. 10 and 11, the first base station 11 in FIG. 1 corresponds to a first base station 501, the second base station 12 shown in FIG. 1 corresponds to a second base station 513, and the mobile station 21 shown in FIG. 1 corresponds to a mobile station 521.

Referring to FIGS. 10A and 10B, in the first base station, a base station network communication unit 502 receives a signal transmitted from a network and notified to the mobile station, and a base station channel coding unit 504 codes the received signal. Thereafter, in an MIMO handover state, a base station control unit 507 controls a transmission data selecting unit 503 to select transmission data, and a base station modulating unit 505 to perform modulation such as multilevel modulation, CDMA or OFDM. The signal is transmitted from a first base station transmitting antenna 508 via a base station transmitting unit 506 including a DA converter and the like.

While the second base station operates similarly to the first base station, transmission data selecting units of the respective base stations select different data so as to transmit all data as a whole. Further, the coded and modulated signal is transmitted from a second base station transmitting antenna 514.

After these signals are transmitted via a transmission line 520 and influenced by the transmission line 520, the mobile station 521 receives a combined wave of a signal 515 from the first base station and a signal 516 from the second base station via a first receiving antenna 522 and a first antenna receiving unit 524 including an AD converter and the like, and also receives a combined wave of a signal 517 from the first base station and a signal 518 from the second base station via a second receiving antenna 523 and a second antenna receiving unit 525 (see FIG. 11).

During a MIMO handover, a mobile station control unit 536 controls a MIMO channel separating unit 526 constituted by MMSE, QR separation or the like to operate. The MIMO channel separating unit 526 separates the signals received via the respective antennas and transmitted from the respective base stations, and eliminates the influence of the propagation lines from the separated signals. In a first base station data demodulating unit 528, a mobile station demodulating unit 529 subjects the signal from the first base station to demodulation such as multilevel modulation, CDMA or OFDM. Further, in a second base station data demodulating unit 531, a mobile station demodulating unit 532 subjects the signal from the second base station to similar demodulation. A MIMO data combining unit 534 constituted by buffer and the like combines these signals, a mobile station channel decoding unit 530 performs channel decoding, a data output processing unit 535 performs an image processing, a voice processing and the like on the combined signal, and the resultant signal is output from external output devices 537 and 538.

A transmission line quality estimating unit 527, external input devices 539 and 540, a data coding unit 541, a mobile station channel coding unit 542, a mobile station modulating unit 543, a mobile station transmitting antenna 545, an upstream signal 519, a first base station receiving antenna 509, a base station receiving unit 510, a base station demodulating unit 511, a base station channel decoding unit 512, and a second base station receiving antenna 546 operate similarly to those shown in FIG. 3, respectively.

[Fourth Embodiment]

Figure 12:
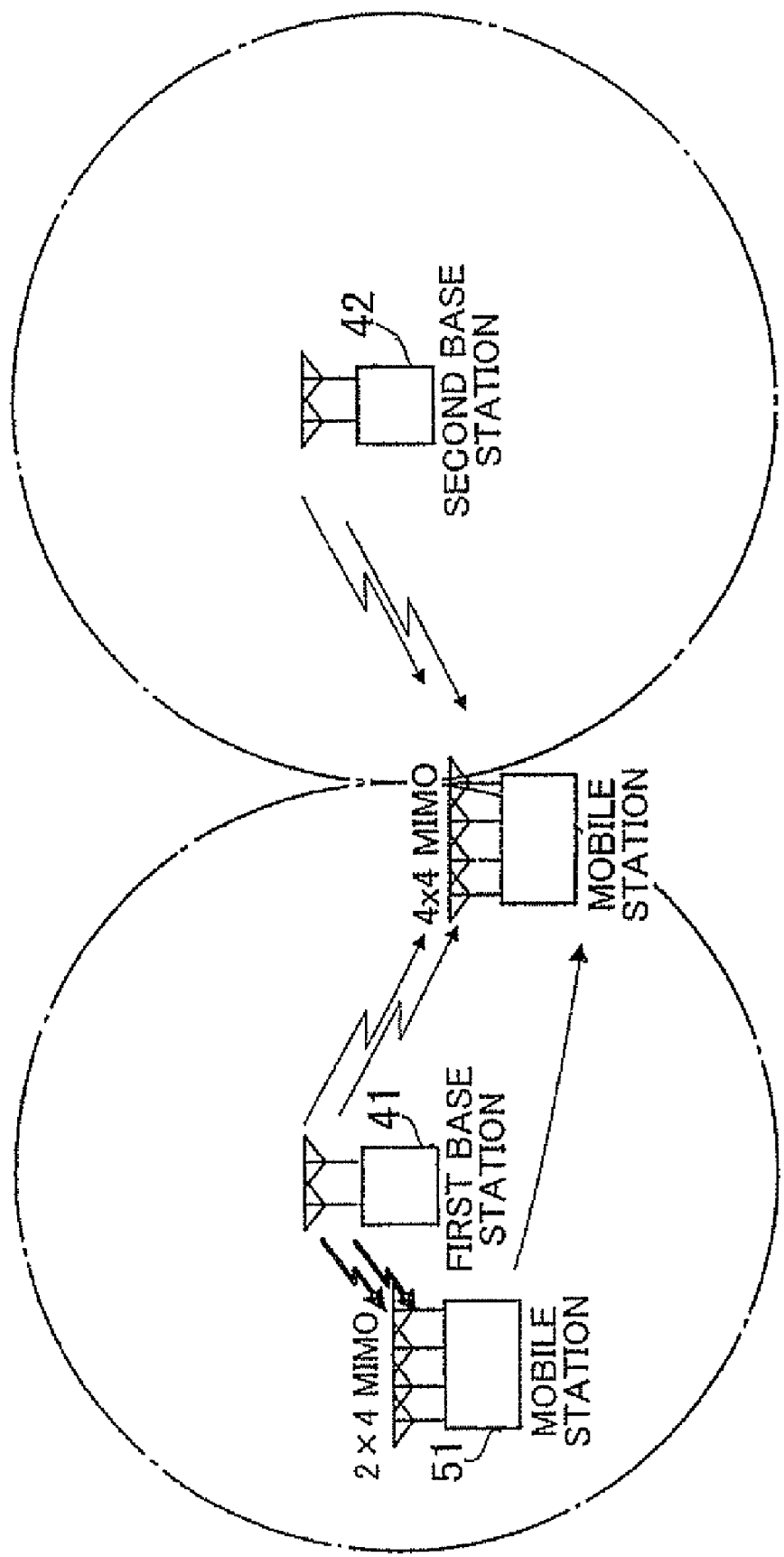
FIG. 12 is a pattern diagram showing a fourth embodiment.

FIG. 12 is a pattern diagram showing a system according to a fourth embodiment of the present invention. In the fourth embodiment, a mobile station 51 includes four receiving antennas, and each of a first base station 41 and a second base station 42 includes two antennas for MIMO communication. In a state 1 in which the mobile station is near the first base station, the mobile station holds MIMO communication only with the first base station. When moving to a location in a state 2, the mobile station is communicable with the second base station and holds MIMO communication with the two base stations.

In this manner, even if the system is originally MIMO system, the MIMO handover can be applied to the system.

[Fifth Embodiment]

Figure 13:
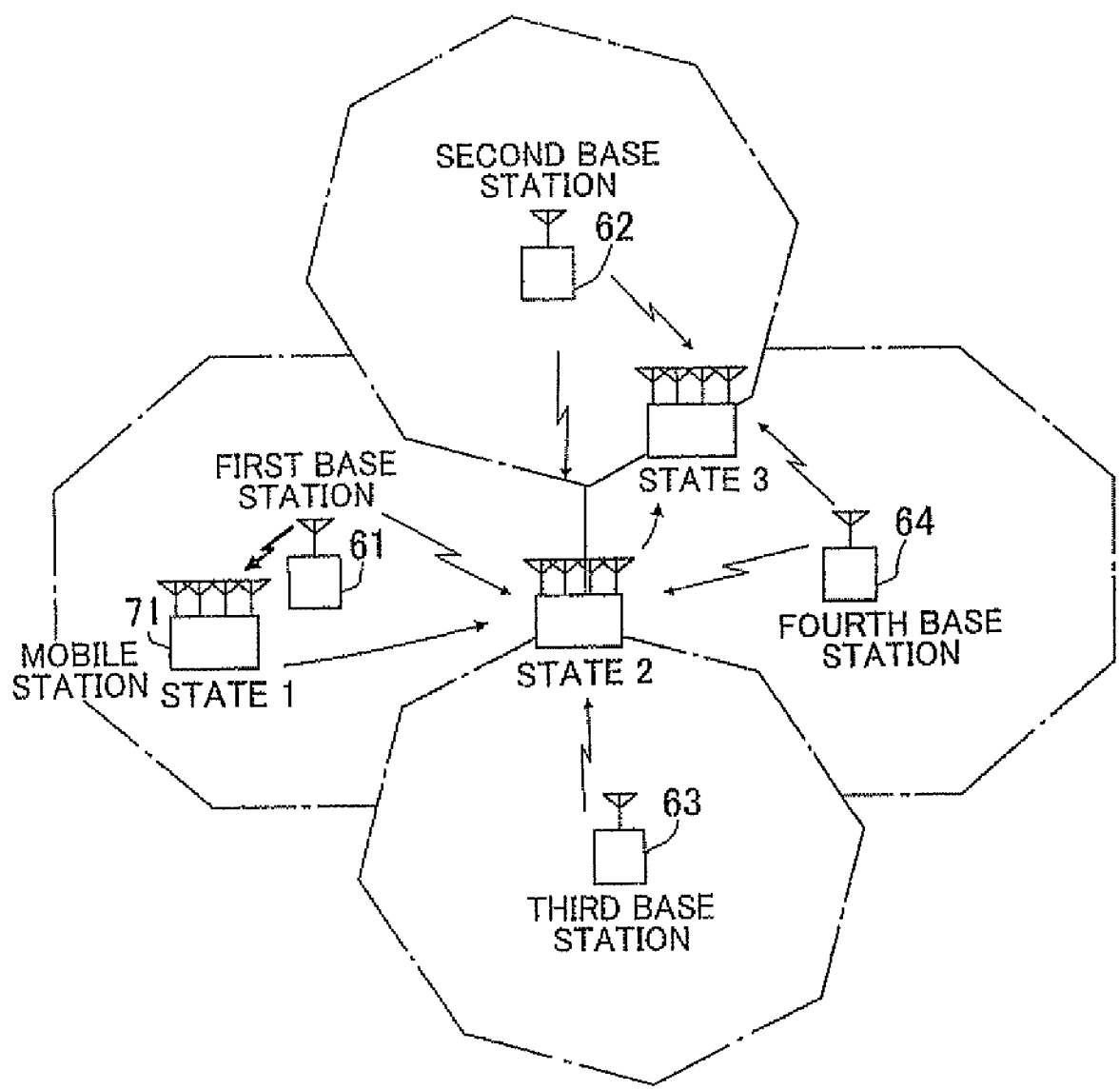
FIG. 13 is a pattern diagram showing a fifth embodiment.

FIG. 13 is a pattern diagram showing a system according to a fifth embodiment of the present invention. In the fifth embodiment, in a state 1 in which a mobile station 71 including four receiving antennas is near a first base station 61, a transmission line state between the mobile station 71 and one base station is good and high speed transmission is possible. Therefore, the mobile station 71 communicates only with the first base station. When moving to a location in a state 2, the mobile station 71 is away from the first base station, the transmission line state is worse, and the mobile station 71 is communicable with a second base station 62, a third base station 63, and a fourth base station 64. Therefore, the mobile station 71 holds MIMO communication with the four base stations. When moving to a location in a state 3, the mobile station 71 is away from the first base station and the third base station and cannot hold communication with the first and third base stations. Therefore, the mobile station 71 holds MIMO communication with the two base stations of the second base station and the fourth base station.

Figure 14:
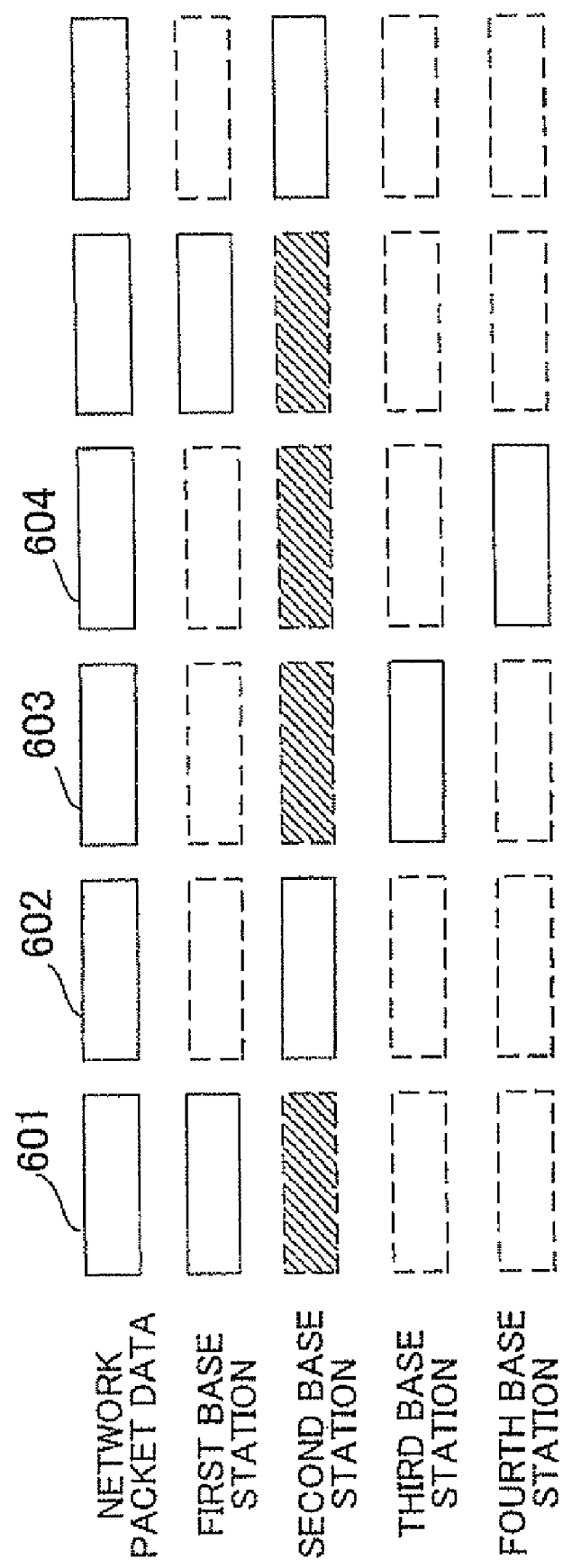
FIG. 14 is a pattern diagram showing an example of a data distribution method according to the fifth embodiment.

FIG. 14 shows an example of a data distribution method in each of the base stations in this case. In the state 2 shown in FIG. 13, the mobile station communicates with the first, second, third, and fourth base stations, and a control unit allocates network packet data 601, 602, 603, and 604 to the first, second, third, and fourth base stations, respectively. In FIG. 14, a white part surrounded by a solid line represents one network packet data allocated to each base station. Generally, each base station exerts retransmission control. However, if the mobile station moves to the state 3 shown in FIG. 13 and cannot communicate with the first and third base stations, the network packet data 601 and 603 cannot be communicated. Due to this, the control unit controls the second base station having a highest priority to hold even packet data that is not allocated to the second base station for transmission until communications of the other base stations with the mobile station end (as indicated by shaded parts). If the communications of the first and third base stations become insufficient, the control unit controls the second base station to retransmit the held data or transfer the data to the other base stations via a network, thereby instructing retransmission.

Priorities of the base stations herein can be obtained by adding information as to whether or not the measured transmission line qualities and temporal changes of the transmission line qualities are improving. Alternatively, the priorities can be obtained based on data rates at which the respective base station can communicate instead of the transmission line quality. Furthermore, the priorities often include those set fixedly depending on the base stations or the mobile station such as capacities of the respective base stations or designation of the mobile station user under contract.

It is obvious that the radio network controller can perform such data holding, if the radio network controller is present. Furthermore, the control unit may be included in the mobile station, the radio network controller, or each base station.

[Sixth Embodiment]

Figure 15:
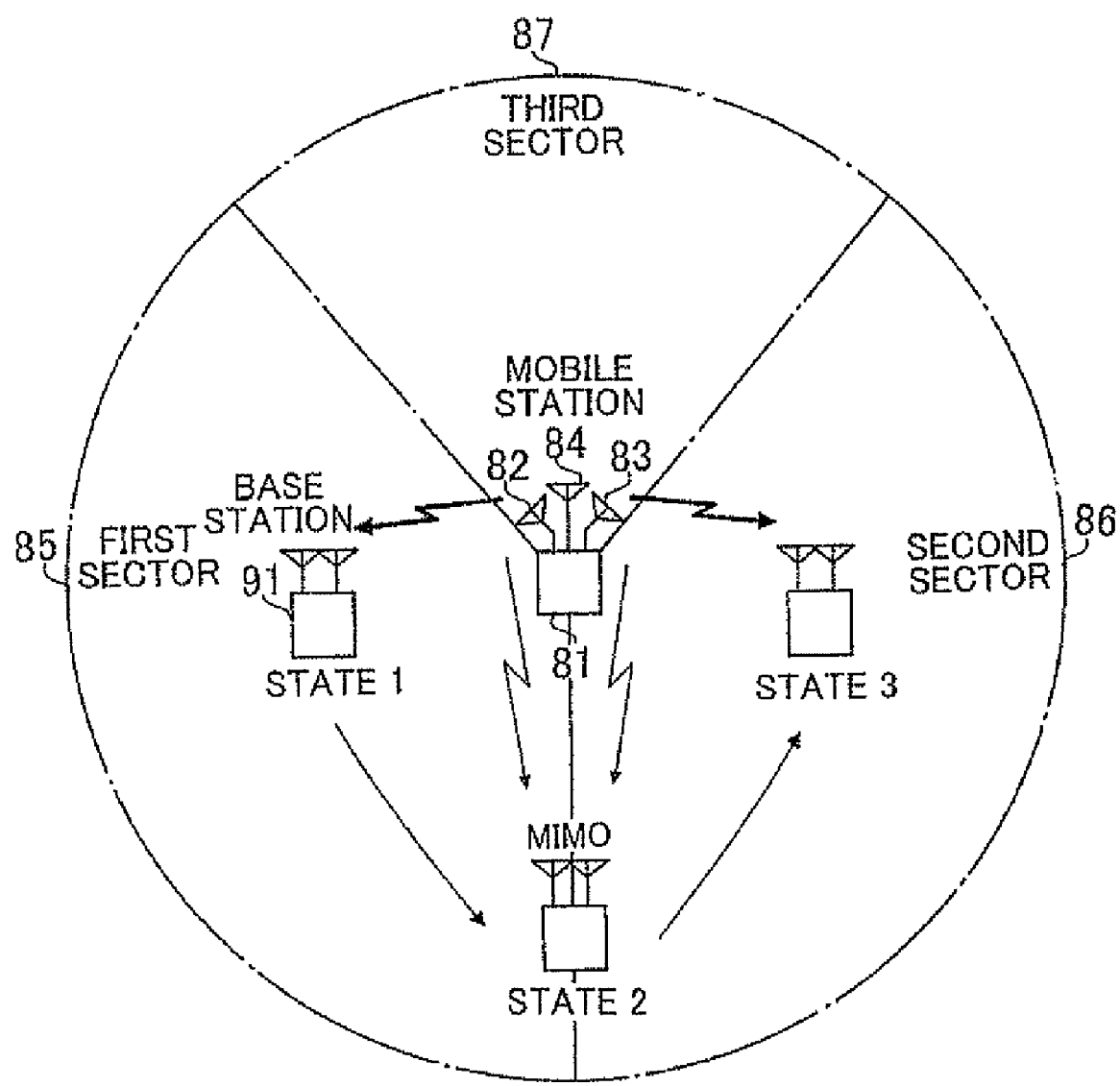
FIG. 15 is a pattern diagram showing a sixth embodiment.

FIG. 15 is a pattern diagram showing a system according to a six embodiment of the present invention. In the sixth embodiment, a base station 81 includes a first sector 85, a second sector 86, and a third sector 87 as well as a first sector antenna 82, a second sector antenna 83, and a third sector antenna 84 with which the mobile station communicates. In a state 1, the mobile station 91 communicates only with the first sector antenna at a desired transmission rate in the first sector. In a state 2 in which the mobile station moves and is near an intermediate position between the first and second sectors and far from a center of a cell, a transmission line state between the mobile station and the first sector antenna is worse or the transmission line state is worse since the mobile station is away from a base station, resulting in a reduction in transmission rate. However, since the mobile station is communicable with tie first and second sectors, the mobile station holds a MIMO communication (performs an intra-cell MIMO handover) with the first and second sectors so as to realize the desired transmission rate. In a state 3 in which the mobile station further moves, the mobile station communicates only with the second sector antenna.

In the mobile station, a transmission line quality estimating unit detects transmission line qualities between a plurality of sector antennas and the mobile station, respectively, and notifies the base station of the transmission line qualities. The mobile station performs MIMO transmission or reception according to an instruction from the base station.

The base station selects one of modulation methods and possible data rates of the first to third sector antennas in response to the notification of the transmission line qualities from the mobile station, selects a combination of sectors necessary to satisfy a data rate expected value for the mobile station, notifies the mobile station of the modulation method, the possible data rate, and the combination of sectors, and performs MIMO transmission or reception.

Alternatively, the base station includes the transmission line quality estimating unit.

[Seventh Embodiment]

The intra-cell MIMO handover as shown in the sixth embodiment can be combined with the MIMO handover (inter-cell MIMO handover) among the base stations according to the first to fifth embodiments.

In a wireless communication system including a plurality of base stations constituting a plurality of sectors and a base station, each base station selects a combination of base stations and sectors so as to obtain a desired transmission data rate from a plurality of sector antennas of a plurality of base stations, distributes data addressed to the single mobile station, and transmits the data by MIMO. The mobile station receives signals from a plurality of sector antennas of a plurality of base stations by MIMO.

In this case, if the intra-cell MIMO handover is easier than the inter-cell MIMO handover and the both handovers are possible and equal in effect, such a selection method of selecting the intra-cell MIMO handover can be executed.

The invention claimed is:

1. A wireless communication system including a plurality of base stations and at least one mobile station, wherein the plurality of base stations include a unit distributing data addressed to a certain mobile station between two or more base stations selected from a group of base stations that can simultaneously communicate with the certain mobile station if a predetermined data rate cannot be obtained by data communication between the certain mobile station and a single base station, and simultaneously transmitting the distributed data from the respective base stations to the certain mobile station by a MIMO (Multi-Input Multi-Output) transmission method, the distributed data being different from the respective base stations;

the at least one mobile station includes a plurality of antennas and a unit receiving the data transmitted from the selected base stations by the MIMO transmission method, by a MIMO reception method using the plurality of antennas, and performs data communication only with a single base station by a non-MIMO transmission or reception method if the predetermined data rate can be obtained by the data communication between the certain mobile station and the single base station; and the selection of base stations is carried out by: measuring transmission line quality between the mobile station and each of peripheral base stations; notifying the base stations of the measured transmission line quality; receiving communicable data rates from the base stations; rearranging the received data rates in a descending order; if a maximum data rate among the received data rates is higher than a predetermined data rate, deciding to select the base station communicable at the maximum data rate; if the maximum data rate is not higher, calculating the number k of base stations satisfying that a sum of data rates of top k base stations in descending order is higher than the predetermined data rate; if the calculated number k exceeds a number N of MIMO antennas owned by the mobile station, deciding to select top N base stations; and if the calculated number k does not exceed the number N, deciding to select top k base stations.

2. The wireless communication system according to claim 1, comprising a control unit controlling the mobile station to hold a data communication only with a single base station out of the plurality of base stations if a predetermined data rate is obtained by a communication between the mobile station and the single base station, and switching a transmission or reception method to the MIMO transmission or reception method for distributing the data using a plurality of base stations if the predetermined data rate is not obtained.

3. The wireless communication system according to claim 1, comprising:
   a mobile station including a transmission line quality estimating unit detecting a transmission line quality between each of the plurality of base stations and the mobile station, and a control unit exerting a control to transmit an inquiry about a communicable data rate to each of the base stations by notifying each of the base stations of the transmission line quality, to select a combination of base stations necessary to satisfy a predetermined data rate using the communicable data rate received from each of the base stations, to notify the base stations of the selected combination, and to perform the MIMO transmission or reception with the base stations; and
   a plurality of base stations each including a control unit that exerts a control to select a modulation method and the communicable data rate in response to the inquiry about the transmission line quality from the mobile station, to notify the mobile station of the modulation method and the communicable data rate, and to select and distribute data addressed to the mobile station according to an instruction from the mobile station.

4. The wireless communication system according to claim 3,
   wherein the plurality of base stations are connected to one another by a network, and comprise a selecting unit causing the respective base stations to independently select packets addressed to the single mobile station and received from the network.

5. The wireless communication system according to claim 3,
   wherein each of the plurality of base stations exerts a retransmission control.

6. The wireless communication system according to claim 1, comprising:
   a mobile station including a transmission line quality estimating unit detecting a transmission line quality between each of the plurality of base stations and the mobile station, and a control unit exerting a control to select a combination of base stations to be communicated with the mobile station based on the transmission line quality, to notify each of the base stations of the selected combination, and to perform the MIMO transmission or reception with the base stations; and
   a plurality of base stations each including a control unit that exerts a control to select and distribute data addressed to the mobile station according to an instruction from the mobile station.

7. The wireless communication system according to claim 1, comprising:
   a mobile station including a transmission line quality estimating unit detecting a transmission line quality between each of the plurality of base stations and the mobile station, and a control unit exerting a control to notify each of the base stations of the transmission line quality, and to perform the MIMO transmission or reception with the plurality of base stations according to an instruction from each of the base stations; and
   a base station including a control unit that exerts a control to select a modulation method and a communicable data rate in response to a notification of the transmission line quality from the mobile station, to communicate the communicable data rate among a plurality of base stations, to select a combination of base stations to be communicated with the mobile station so as to satisfy a predetermined data rate for the mobile station using the communicable data rate, and to perform the MIMO transmission or reception with the mobile station.

8. The wireless communication system according to claim 1, comprising:
   a base station including a transmission line quality estimating unit detecting a transmission line quality between the base station and the mobile station, and a control unit exerting a control to select a modulation method and a communicable data rate in response to the transmission line quality detected by each of the base stations, to communicate the communicable data rate among a plurality of base stations, to select a combination of base stations for satisfying a predetermined data rate for the mobile station using the communicable data rate with respect to the same mobile station, and to perform the MIMO transmission or reception with the mobile station; and
   a mobile station including a control unit that exerts a control to perform the MIMO transmission or reception according to an instruction from the base station.

9. The wireless communication system according to claim 1, comprising:
   a mobile station including a transmission line quality estimating unit detecting a transmission line quality between each of the plurality of base stations and the mobile station, and a control unit exerting a control to notify a radio network controller connected to the plurality of base stations of the transmission line quality, and to perform the MIMO transmission or reception with the base stations according to an instruction from the radio network controller;
   a radio network controller including a control unit exerting a control to select a modulation method and a communicable data rate to each of the base stations in response to the transmission line quality transmitted via the base station from the mobile station, to select a combination of base stations necessary to satisfy a predetermined data rate for the mobile station, to notify each of the base stations and the mobile station of the selected combination, and to perform the MIMO transmission or reception with the base stations of the selected combination; and
   a plurality of base stations controlled by the radio network controller.

10. The wireless communication system according to claim 1, comprising:
    a plurality of base stations each including a transmission line quality estimating unit detecting a transmission line quality between each of the plurality of base stations and the mobile station;

a radio network controller including a control unit exerting a control to select a modulation method and a communicable data rate available to each of the base stations in response to the transmission line quality, to select a combination of base stations so that a sum of the communicable data rates with respect to the same mobile station satisfies a predetermined data rate for the mobile station, and to perform MIMO transmission or reception among the base stations of the selected combination and the mobile station; and a mobile station performing the MIMO transmission or reception according to an instruction from the radio network controller via the base stations.

11. A wireless communication system including a base station constituting a plurality of sectors and at least one mobile station, wherein the base station includes a unit distributing data addressed to a certain mobile station between two or more sectors selected from a group of sectors that can simultaneously communicate with the certain mobile station if a predetermined data rate cannot be obtained by data communication between the certain mobile station and a single sector, and simultaneously transmitting the distributed data from the respective sectors to the certain mobile station by a MIMO transmission method, the distributed data being different from the respective sectors;

the at least one mobile station includes a plurality of antennas and a unit receiving the data transmitted from the selected sectors by the MIMO transmission method, by a MIMO reception method using the plurality of antennas, and performs data communication only with a single sector by a non-MIMO transmission or reception method if the predetermined data rate can be obtained by the data communication between the certain mobile station and the single sector; and the selection of sectors is carried out by: measuring transmission line quality between the mobile station and each of peripheral sectors; notifying the base station of the measured transmission line quality; receiving communicable data rates from the base station; rearranging the received data rates in a descending order; if a maximum data rate among the received data rates is higher than a predetermined data rate, deciding to select the sector communicable at the maximum data rate; if the maximum data rate is not higher, calculating the number k of sectors satisfying that a sum of data rates of top k sectors in descending order is higher than the predetermined data rate; if the calculated number k exceeds a number N of MIMO antennas owned by the mobile station, deciding to select top N sectors; and if the calculated number k does not exceed the number N, deciding to select top k sectors.

12. The wireless communication system according to claim 11, comprising a control unit controlling the mobile station to hold a data communication only with an antenna or antennas of a single sector out of the antennas of the plurality of sectors if a predetermined data rate is obtained by a communication between the mobile station and the antennas of the single sector, and switching a transmission or reception method to the MIMO transmission or reception method for distributing the data using the antennas of the plurality of sectors if the predetermined data rate is not obtained.

13. The wireless communication system according to claim 11, comprising:

a mobile station including a transmission line quality estimating unit detecting a transmission line quality between each of the antennas of the plurality of sectors and the mobile station, and a control unit exerting a control to notify the base station of the transmission line quality, and to perform the MIMO transmission or reception according to an instruction from the base station; and a base station including a control unit exerting a control to select a modulation method and a communicable data rate for the antennas of the plurality of sectors in response to a notification of the transmission line quality from the mobile station, to select a combination of sectors necessary to satisfy a predetermined data rate for the mobile station, to notify the mobile station of the selected combination, and to perform the MIMO transmission or reception.

14. The wireless communication system according to claim 11, including a plurality of base stations constituting a plurality of sectors and a mobile station, comprising:

a base station distributing and transmitting data addressed to the single mobile station by the MIMO using the antennas of the plurality of sectors of each of the base stations; and a mobile station receiving signals from the antennas of the plurality of sectors of each of the plurality of base stations by the MIMO.

15. A wireless communication method by a plurality of base stations and at least one mobile station, including steps of:

causing the plurality of base stations to distribute data addressed to a certain mobile station between two or more base stations selected so as to satisfy a predetermined data rate from a group of base stations that can simultaneously communicate with the certain mobile station if the predetermined data rate cannot be obtained by data communication between the certain mobile station and a single base station, and to simultaneously transmit the distributed data from the respective base stations to the certain mobile station by a MIMO transmission method, the distributed data being different from the respective base stations;

causing the at least one mobile station having a plurality of antennas to receive the data transmitted from the selected base stations by the MIMO transmission method, by a MIMO reception method using the plurality of antennas, and to perform data communication only with a single base station by a non-MIMO transmission or reception method if the predetermined data rate can be obtained by the data communication between the certain mobile station and the single base station; and the selection of base stations is carried out by: measuring transmission line quality between the mobile station and each of peripheral base stations; notifying the base stations of the measured transmission line quality; receiving communicable data rates from the base stations; rearranging the received data rates in a descending order; if a maximum data rate among the received data rates is higher than a predetermined data rate, deciding to select the base station communicable at the maximum data rate; if the maximum data rate is not higher, calculating the number k of base stations satisfying that a sum of data rates of top k base stations in descending order is higher than the predetermined data rate; if the calculated number k exceeds a number N of MIMO antennas owned by the mobile station, deciding to select top N base stations; and if the calculated number k does not exceed the number N, deciding to select top k base stations.

16. The wireless communication method according to claim 15, comprising steps of
holding a data communication only with a single base station out of the plurality of base stations if a predetermined data rate is obtained by a communication between the certain mobile station and the single base station, and switching to a MIMO transmission or reception method for distributing the data using a plurality of base stations if the predetermined data rate is not obtained.

17. A wireless communication method by a plurality of base stations constituting a plurality of sectors and at least one mobile station, including steps of:
causing the plurality of base stations to distribute data addressed to a certain mobile station between two or more sectors selected from a group of sectors that can simultaneously communicate with the certain mobile station if a predetermined data rate cannot be obtained by data communication between the certain mobile station and a single sector, and simultaneously transmit the distributed data from the respective sectors to the certain mobile station by a MIMO transmission method, the distributed data being different from the respective sectors;
causing the at least one mobile station having a plurality of antennas to receive the data transmitted from the selected sectors by the MIMO transmission method, by a MIMO reception method using the plurality of antennas, and to perform data communication only with a single sector by a non-MIMO transmission or reception method if the predetermined data rate can be obtained by the communication between the certain mobile station and the single sector; and
the selection of sectors is carried out by: measuring transmission line quality between the mobile station and each of peripheral sectors; notifying the base station of the measured transmission line quality; receiving communicable data rates from the base station; rearranging the received data rates in a descending order; if a maximum data rate among the received data rates is higher than a predetermined data rate, deciding to select the sector communicable at the maximum data rate; if the maximum data rate is not higher, calculating the number k of sectors satisfying that a sum of data rates of top k sectors in descending order is higher than the predetermined data rate; if the calculated number k exceeds a number N of MIMO antennas owned by the mobile station, deciding to select top N sectors; and if the calculated number k does not exceed the number N, deciding to select top k sectors.

18. A wireless mobile station device comprising:
a plurality of antennas of MIMO reception for receiving signals from two or more base stations selected from a group of base stations that can simultaneously communicate with the wireless mobile station device if a predetermined data rate cannot be obtained by data communication between the wireless mobile station device and a single base station;
a MIMO separating unit separating the signals transmitted from the selected base stations according to transmission line characteristics of the respective base stations;
a demodulating unit demodulating the separated signals from the respective base stations;
a decoding and MIMO data combining unit decoding the demodulated signals and for combining the signals from the respective base stations; and
a control unit exerting a control to receive the signals from the selected base stations by a MIMO transmission or reception method, and to receive a signal from a single base station by a non-MIMO transmission or reception method if the predetermined data rate can be obtained by data communication between the wireless mobile station device and the single base station,
wherein the selection of base stations is carried out by: measuring transmission line quality between the mobile station and each of peripheral base stations; notifying the base stations of the measured transmission line quality; receiving communicable data rates from the base stations; rearranging the received data rates in a descending order; if a maximum data rate among the received data rates is higher than a predetermined data rate, deciding to select the base station communicable at the maximum data rate; if the maximum data rate is not higher, calculating the number k of base stations satisfying that a sum of data rates of top k base stations in descending order is higher than the predetermined data rate; if the calculated number k exceeds a number N of MIMO antennas owned by the mobile station, deciding to select top N base stations; and if the calculated number k does not exceed the number N, deciding to select top k base stations.

19. The wireless mobile station device according to claim 18, further comprising a transmission line quality estimating unit detecting a transmission line quality between each of the base stations and the wireless mobile station device,
wherein the control unit exerts a control to transmit an inquiry about a communicable data rate to each of the base stations by notifying each of the base stations of the transmission line quality, to select a combination of base stations communicating so as to satisfy a predetermined data rate using the communicable data rate received from each of the base stations, to notify the base stations of the selected combination, and to perform the MIMO transmission or reception.

20. The wireless mobile station device according to claim 18, further comprising a transmission line quality estimating unit detecting a transmission line quality between each of the plurality of base stations and the mobile station,
wherein the control unit exerts a control to select a combination of base stations to be communicated with the wireless mobile station device based on the transmission line quality, to notify each of the base stations of the selected combination, and to perform the MIMO transmission or reception.

21. A radio network controller comprising:
a network communication unit being connected to a network and holding a communication;
a distributing unit distributing data addressed to a certain mobile station between two or more base stations selected from a group of base stations that can simultaneously communicate with the certain mobile station if a predetermined data rate cannot be obtained by data communication between the certain mobile station and a single base station, and causing the two or more base stations to simultaneously transmit the distributed data from the respective base stations to the certain mobile station by a MIMO transmission method, the distributed data being different from the respective base stations, and to transmit the data addressed to the mobile station to a single base station by a non-MIMO transmission method if the predetermined data rate can be obtained by data communication between the certain mobile station and the single base station,
wherein the selection of base stations is carried out by: measuring transmission line quality between the mobile station and each of peripheral base stations; notifying the base stations of the measured transmission line quality; receiving communicable data rates from the base stations; rearranging the received data rates in a descending order; if a maximum data rate among the received data rates is higher than a predetermined data rate, deciding to select the base station communicable at the maximum data rate; if the maximum data rate is not higher, calculating the number k of base stations satisfying that a sum of data rates of top k base stations in descending order is higher than the predetermined data rate; if the calculated number k exceeds a number N of MIMO antennas owned by the mobile station, deciding to select top N base stations; and if the calculated number k does not exceed the number N, deciding to select top k base stations.

22. The radio network controller according to claim 21, further comprising a control unit transmitting an instruction to select a combination of base stations to be communicated with the certain mobile station and a combination of data rates for satisfying a predetermined data rate for the single base station based on a transmission line quality between each of the base stations and the certain mobile station transmitted from each of the base stations or from the certain mobile station via the base stations, to cause the distributing unit to distribute data based on the combination of the base stations and the combination of the data rates, and to use the distributed data for the MIMO transmission or reception.

23. A wireless base station device comprising:
a plurality of antennas for MIMO transmission;
a transmission data selecting unit partially selecting, from among data addressed to a single mobile station, signals allocated to the wireless base station device in the case of MIMO transmission or reception with two or more base stations selected from a group of base stations that can simultaneously communicate with the single mobile station if a predetermined data rate cannot be obtained by data communication between the single mobile station and a single base station; and
a control unit exerting a control to transmit the selected signals from the wireless base station device to the single mobile station in the case of MIMO transmission or reception with the selected base stations, and to cause the selecting unit either to select all the data for the single mobile station or not to select any of the data for the single mobile station in a state of a non-MIMO transmission or reception with the the base station if the predetermined data rate can be obtained by data communication between the single mobile station and the single base station,
wherein the selection of base stations is carried out by: measuring transmission line quality between the mobile station and each of peripheral base stations; notifying the base stations of the measured transmission line quality; receiving communicable data rates from the base stations; rearranging the received data rates in a descending order; if a maximum data rate among the received data rates is higher than a predetermined data rate, deciding to select the base station communicable at the maximum data rate; if the maximum data rate is not higher, calculating the number k of base stations satisfying that a sum of data rates of top k base stations in descending order is higher than the predetermined data rate; if the calculated number k exceeds a number N of MIMO antennas owned by the mobile station, deciding to select top N base stations; and if the calculated number k does not exceed the number N, deciding to select top k base stations.

24. The wireless base station device according to claim 23, further comprising a transmission line quality estimating unit detecting a transmission line quality between each of the base stations and the single mobile station.

25. The wireless base station device according to claim 23, wherein the control unit exerts the control to select a modulation method and a communicable data rate available to each of the base stations in response to the transmission line quality, to select a combination of base stations so that a sum of the communicable data rates with respect to the same mobile station satisfies a predetermined data rate for the single mobile station, and to perform the MIMO transmission or reception.

26. The wireless base station device according to claim 23, further comprising a coding unit coding signals transmitted from a network and notified to the mobile station, wherein the coding unit is provided in front of the data selecting unit.

27. The wireless base station device according to claim 23, wherein the plurality of base stations is connected to one another by a network, and packets addressed to the single mobile station received from the network are allocated to the respective base stations independently.

28. The wireless base station device according to claim 23, wherein the control unit exerts a retransmission control.

* * * * *